United States Patent
Sagae et al.

(10) Patent No.: US 11,366,266 B2
(45) Date of Patent: Jun. 21, 2022

(54) OPTICAL FIBER AND OPTICAL TRANSMISSION SYSTEM

(71) Applicant: NIPPON TELEGRAPH AND TELEPHONE CORPORATION, Tokyo (JP)

(72) Inventors: Yuto Sagae, Tsukuba (JP); Kazuhide Nakajima, Tsukuba (JP); Takashi Matsui, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 271 days.

(21) Appl. No.: 16/623,608

(22) PCT Filed: Jul. 3, 2018

(86) PCT No.: PCT/JP2018/025192
§ 371 (c)(1),
(2) Date: Dec. 17, 2019

(87) PCT Pub. No.: WO2019/009284
PCT Pub. Date: Jan. 10, 2019

(65) Prior Publication Data
US 2020/0116925 A1  Apr. 16, 2020

(30) Foreign Application Priority Data
Jul. 3, 2017 (JP) .............. JP2017-130725

(51) Int. Cl.
*G02B 6/02* (2006.01)
*G02B 6/036* (2006.01)
*H04B 10/80* (2013.01)

(52) U.S. Cl.
CPC .............. *G02B 6/036* (2013.01); *G02B 6/02* (2013.01); *G02B 6/03633* (2013.01);
(Continued)

(58) Field of Classification Search
CPC .. G02B 6/02; G02B 6/02009; G02B 6/02042; G02B 6/036; G02B 6/03633; H04B 10/80
See application file for complete search history.

(56) References Cited

U.S. PATENT DOCUMENTS

| | | | |
|---|---|---|---|
| 6,546,177 B1 | 4/2003 | Matsuo et al. | |
| 7,164,829 B2 | 1/2007 | Tsukitani et al. | |
| (Continued) | | | |

FOREIGN PATENT DOCUMENTS

| | | | |
|---|---|---|---|
| CN | 101226258 A | 7/2008 | |
| CN | 101281275 A | 10/2008 | |
| (Continued) | | | |

OTHER PUBLICATIONS

Chinese Office Action from counterpart CN2018800410106, dated Apr. 26, 2020.
(Continued)

*Primary Examiner* — Ryan A Lepisto

(57) ABSTRACT

An optical fiber includes a core, a first clad that is provided on an outer circumferential portion of the core and has a refractive index lower than that of the core, and a second clad that is provided on an outer circumferential portion of the first clad and has a refractive index lower than that of the first clad. In the optical fiber, a mode field diameter at a wavelength of 1.55 μm is equal to or greater than 11.5 μm, a cutoff wavelength is equal to or less than 1.53 μm, a bending loss at a bending radius of 30 mm and a wavelength of 1.625 μm is equal to or less than 2.0 dB/100 turns, and a delay time of transmission light per unit length at a wavelength of 1.55 μm is equal to or less than 4.876 μs/km.

7 Claims, 24 Drawing Sheets

(52) U.S. Cl.
CPC ......... *H04B 10/80* (2013.01); *G02B 6/02009* (2013.01); *G02B 6/02042* (2013.01)

(56) References Cited

U.S. PATENT DOCUMENTS

| | | | |
|---|---|---|---|
| 9,069,118 B2* | 6/2015 | Matsuo | G02B 6/02042 |
| 9,151,887 B2* | 10/2015 | Hoover | G02B 6/03644 |
| 9,477,037 B1* | 10/2016 | Bickham | G02B 6/03666 |
| 9,638,867 B2* | 5/2017 | Li | G02B 6/02042 |
| 9,692,201 B2* | 6/2017 | Watanabe | H01S 3/06737 |
| 9,835,812 B2* | 12/2017 | Yadlowsky | G02B 6/4403 |
| 2012/0106909 A1* | 5/2012 | Bickham | G02B 6/03683 385/124 |
| 2014/0178024 A1 | 6/2014 | Takenaga et al. | |
| 2014/0248026 A1* | 9/2014 | Yang | G02B 6/036 385/127 |
| 2015/0301277 A1* | 10/2015 | Chen | G02B 6/02009 385/127 |
| 2015/0323735 A1* | 11/2015 | Ishida | G02B 6/02 385/124 |
| 2016/0109651 A1* | 4/2016 | Borel | G02B 6/0365 385/128 |
| 2018/0128968 A1* | 5/2018 | Zhang | G02B 6/03683 |

FOREIGN PATENT DOCUMENTS

| | | |
|---|---|---|
| CN | 102156323 A | 8/2011 |
| CN | 102213792 A | 10/2011 |
| EP | 0689068 B1 | 5/2002 |
| EP | 2713188 A1 | 4/2014 |
| EP | 2833174 A1 | 2/2015 |
| EP | 3012235 A2 | 4/2016 |
| EP | 3330756 A1 | 6/2018 |
| JP | 2001147338 A | 5/2001 |
| JP | 2015212791 A | 11/2015 |
| JP | 2015536474 A | 12/2015 |
| WO | WO-2013035708 A1 | 3/2013 |
| WO | WO-2017/020457 A1 | 2/2017 |

OTHER PUBLICATIONS

N. V. Wheeler et. al., "Wide-bandwidth, low-loss, 19-cell hollow core photonic band gap fiber and its potential for low latency data transmission," OFC/NFOEC Postdeadline Papers PDP5A.2 2012.
International Search Report (English and Japanese) issued in International Application No. PCT/JP2018/025192, dated Oct. 2, 2018; ISA/JP.

* cited by examiner

FIG. 26

| | WAVELENGTH | TRIAL-MANUFACTURED FIBER | CONVENTIONAL SMF | CSF | MEASURING METHOD |
|---|---|---|---|---|---|
| MFD [μm] | 1.55 μm | 12.6 | 10.5 | 11.8 | FFP MEASUREMENT |
| $A_{eff}$ [μm] | 1.55 μm | 117.5 | 74.9 | 111.3 | CALCULATION FROM $\pi \times [MFD/2]^2$ |
| CUTOFF WAVELENGTH [μm] | - | 1.45 | 1.14 | 1.34 | MULTI-MODE EXCITATION METHOD |
| BENDING LOSS [dB/turn] (R=15mm) | 1.625 μm | 0.032 | 0.108 | 0.033 | MEASUREMENT OF VARIATION OF EXIT POWER DUE TO BENDING |
| TRANSMISSION LOSS [dB/km] | 1.55 μm | 0.193 | 0.193 | 0.167 | MEASUREMENT OF CUT-BACK |
| RAYLEIGH SCATTERING LOSS [dB/km] | 1.55 μm | 0.161 | 0.166 | 0.146 | LINE FITTING TO PLOT WITH WAVELENGTH$^{-4}$ |
| CHROMATIC DISPERSION [ps/nm/km] | 1.55 μm | 19.1 | 16.6 | 20.7 | |
| NONLINEAR COEFFICIENT [/W] | 1.55 μm | $1.79 \times 10^{-10}$ | $2.95 \times 10^{-10}$ | $1.90 \times 10^{-10}$ | CW-SPM METHOD |

OPTICAL FIBER AND OPTICAL TRANSMISSION SYSTEM

CROSS-REFERENCE TO RELATED APPLICATIONS

This application is a 371 National Stage of International Application No. PCT/JP2018/025192, filed on Jul. 3, 2018, which claims priority to Japanese Application No. 2017-130725, filed on Jul. 3, 2017. The entire disclosures of the above applications are incorporated herein by reference.

TECHNICAL FIELD

The invention relates to an optical fiber and an optical transmission system.

BACKGROUND ART

With recent diversified use of communication networks, there is a demand for a reduction of transmission delay. For example, in communication between computers which is frequently used for financial transactions which are carried out on an international scale, a reduction in a transmission delay of 1 ms has a great influence on the transmission performance of communication, financial transaction services, and customer profit or loss. In the future, the demand for further reduction of a transmission delay is expected to accelerate.

In long-distance communication networks such as a submarine optical cable network crossing the Pacific Ocean, a construction length of a communication line amounts to several thousands of kilometers. For improvement in transmission performance of a long-distance communication network, it is important to reduce a delay which occurs in a transmission line. In a submarine optical cable network, effort to reduce a delay in a communication line by optimizing a constructed route of an intercontinental submarine optical cable network are made. By this effort, it has been reported that a transmission delay of a long-distance communication network is reduced by about several ms.

A delay of a communication network includes a delay which is caused in a device such as a transmission device and a delay which is caused in a transmission line. In a long-distance communication network, a delay time which is caused in a transmission line occupies most of a delay time which occurs in the whole network and becomes too long to ignore.

A delay time of an optical fiber per unit time in a transmission line of a communication network is mainly determined according to a refractive index of a medium of the optical fiber. In order to reduce a transmission delay of a communication network, it is effective to use a medium with a low refractive index as a medium of an optical fiber. A cutoff shift fiber which is used for a submarine optical cable network in the related art includes a core which is formed of silica glass with high purity. Accordingly, in a submarine optical cable network in the related art, light can be transmitted with a delay time of about 4.876 µs/km in a wavelength band including 1.55 µm. In Non-Patent Literature 1, it is reported that a delay time of a photonic band gap fiber is reduced by about 3.448 µs/km. The photonic band gap fiber includes a hollow core in which a refractive index of a medium is lowered to the utmost limit.

CITATION LIST

Non-Patent Literature

[Non-Patent Literature 1]
N. V. Wheeler et al., "Wide-bandwidth, low-loss, 19-cell hollow core photonic band gap fiber and its potential for low latency data transmission," OFC/NFOEC Post deadline Papers PDP5A.2 2012.

SUMMARY OF INVENTION

Technical Problem

As described above, in a long-distance communication network, a delay time is improved by optimization of a constructed route. However, geometrical conditions or construction costs are limited in actually optimizing a constructed route, and there is a problem in that a reduction amount in delay time due to optimization of a constructed route is decreased by this limitation.

In a photonic band gap fiber, a hollow core with a low refractive index is formed. However, since a transmission loss of a photonic band gap fiber amounts to about several dB/km, there is a problem in that the photonic band gap fiber is not suitable for a transmission line of a long-distance communication network.

The invention is made in consideration of the above-mentioned problems and an objective thereof is to provide an optical fiber that can be applied to a long-distance communication network, has a mode field diameter (MFD) and a bending loss which are equivalent to an MFD and a bending loss of a cutoff shifted fiber according to the related art, and has a delay time which is less than a delay time of the cutoff shifted fiber.

The invention provides an optical transmission system of which the optical fiber has excellent characteristics.

Solution to Problem

The inventors newly found design conditions and structures of an optical fiber having five features: (1) the optical fiber includes a core, a first clad which is adjacent to an outer circumferential portion of the core, and a second clad which is adjacent to an outer circumferential portion of the first clad, (2) a radius of the core is equal to or less than 4 µm, (3) a relative refractive index difference of the first clad from the core is equal to or less than 0.0%, (4) a mode field diameter (MFD) at a wavelength of 1.55 µm is equal to or greater than 11.5 µm, and (5) a bending loss at a bending radius of 30 mm and a wavelength of 1.625 µm is equal to or less than 2.0 dB/100 turns as an optical fiber for solving the above-mentioned problems.

An optical fiber according to the invention includes a core, a first clad that is provided on an outer circumferential portion of the core and has a refractive index lower than that of the core, and a second clad that is provided on an outer circumferential portion of the first clad and has a refractive index lower than that of the first clad. A mode field diameter of the optical fiber according to the invention at a wavelength of 1.55 µm is equal to or greater than 11.5 µm. A cutoff wavelength of the optical fiber according to the invention is equal to or less than 1.53 µm. A bending loss of the optical fiber according to the invention at a bending radius of 30 mm and a wavelength of 1.625 µm is equal to or less than 2.0 dB/100 turns. A delay time of transmission light of the optical fiber according to the invention per unit length at a wavelength of 1.55 μm is equal to or less than 4.876 μs/km.

In the optical fiber according to the invention, a radius of the core may be equal to or greater than 1.0 μm and equal to or less than 4.3 μm, and a radius of the first clad may satisfy Equations (1) and (2).

[Equation 1]

$$a_2 \geq 2\{(1.43a_1^{-1.45})^2 - (\Delta_1 + 1.43a_1^{-1.45})^2\}^{-0.50a_1^{-0.37}} \quad (1)$$

[Equation 2]

$$5.56 - 3.94\log\left(1 + \frac{\Delta_1}{0.19 + 0.69a_1^{-2.00}}\right) \leq \quad (2)$$

$$a_2 \leq 7.68 + (1.14 - 2.51a_1)\log\left(1 + \frac{\Delta_1}{0.81a_1^{-0.77}}\right)$$

In Equations (1) and (2), $a_1$ represents the radius [μm] of the core. $a_2$ represents the radius [μm] of the first clad. $\Delta_1$ represents a relative refractive index difference [%] of the first clad from the core.

In the optical fiber according to the invention, the relative refractive index difference of the second clad from the first clad may satisfy Equation (3).

$$\Delta_2 \geq -0.033 + (-7.490 - 0.187a_1^{3.407}\Delta_1 - 0.044a_1^{4.324}\Delta_1^2)a_2^{-1.876 - 0.014a_1^{3.09}\Delta_1} \quad (3)$$

In the optical fiber according to the invention, in a sectional view, a plurality of low-delay cores including the core as a first core and the first clad provided on an outer circumferential portion of the first core may be disposed on concentric circles at the center of the second clad.

In the optical fiber according to the invention, the core may be disposed as a second core at the center of the second clad.

In the optical fiber according to the invention, in a sectional view, a low-delay core including the core as a first core and the first clad provided on an outer circumferential portion of the first core may be disposed at the center of the second clad, and the core may be disposed as a third core on a concentric circle at the center of the low-delay core.

In the optical fiber according to the invention, in a sectional view, a low-delay core including the core as a first core and the first clad provided on an outer circumferential portion of the first core may be disposed at the center of the second clad, and the cores may be packed most closely as fourth cores around the low-delay core.

An optical transmission system according to the invention includes the above-mentioned optical fiber, a transmitter that is connected to one end of the optical fiber and a receiver that is connected to the other end of the optical fiber.

Advantageous Effects of Invention

According to the invention, it is possible to provide an optical fiber that has an MFD and a bending loss which are equivalent to an MFD and a bending loss of a cutoff shifted fiber according to the related art and has a delay time which is less than a delay time of the cutoff shifted fiber. According to the invention, since compatibility between the optical fiber and an existing submarine optical cable network is acquired, the delay time of the optical fiber decreases. According to the invention, since a transmission line is constructed with the optical fiber according to the invention, a delay time in the transmission line of the optical transmission system decreases and a delay time in the whole optical transmission system decreases.

BRIEF DESCRIPTION OF DRAWINGS

FIG. 26 is a diagram showing results of measurement and evaluation of optical characteristics in the optical fiber according to the invention which has been manufactured by trial, a conventional SMF and a CSF (various fibers).

DESCRIPTION OF EMBODIMENTS

Hereinafter, embodiments of the invention will be described with reference to the accompanying drawings. The embodiments described below are examples of the invention, but the invention is not limited to these embodiments. In the specification and the drawings, elements having the same functions will be referred to by the same reference signs and description thereof will not be repeated.

Figure 1:
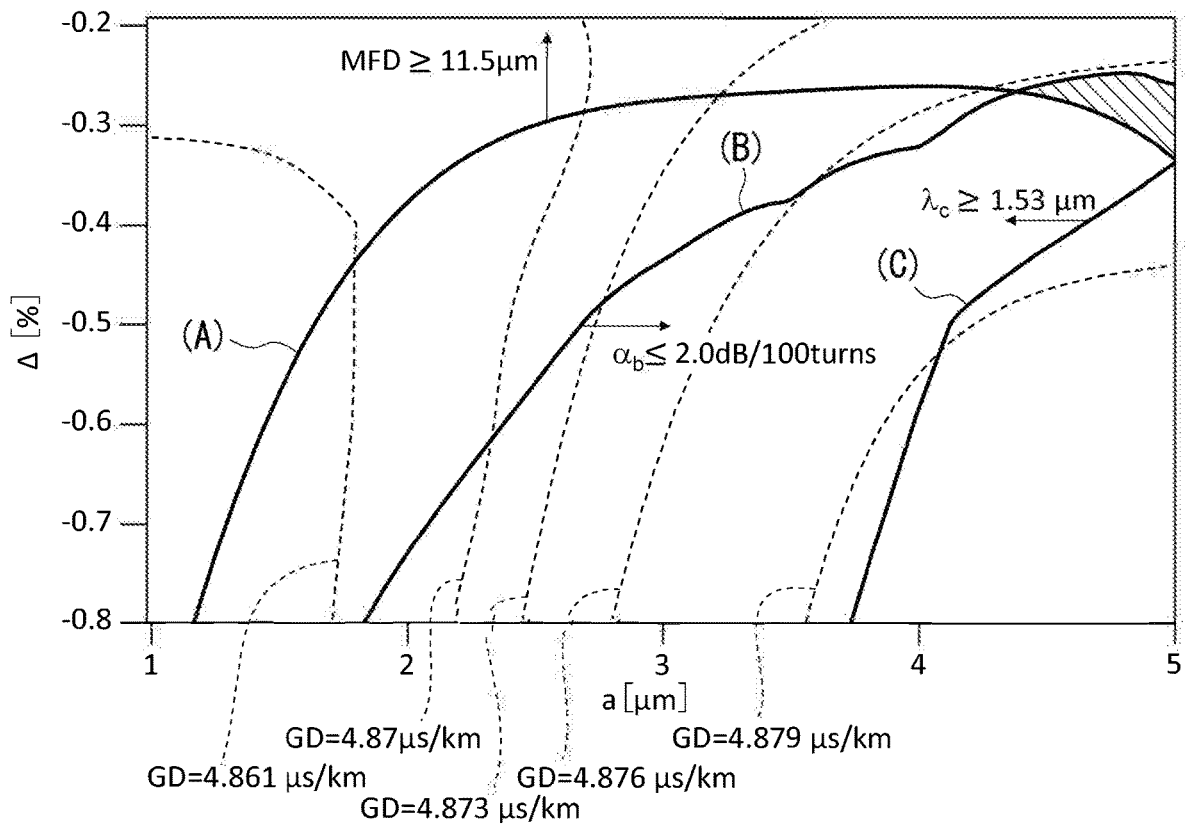
FIG. 1 is a graph showing a relationship between optical characteristics and a delay time in a silica-core fiber according to the related art.

A silica-core fiber according to the related art includes a core (which may be referred to as a core area) formed of silica glass ($SiO_2$) with a high purity of 99.8 wt % or more and has a conventional step index type refractive index distribution. As is well known, in a step index type refractive index distribution, a refractive index of a core that transmits light and a refractive index of a clad (which may be referred to as a clad area) are uniform. A relationship between optical characteristics (a radius a [μm] of a core formed of silica and a relative refractive index difference $\Delta$ [%] of a clad from the core) and a delay time in a silica-core fiber according to the related art is shown in FIG. 1. The refractive index of silica is 1.444377 at a wavelength of 1.55 μm.

Optical characteristics of a cutoff shifted fiber which is used mainly for a submarine optical cable are prescribed in Recommendation G.654.D of International Telecommunication Union-Telecommunication Standardization Sector (ITU-T). In Recommendation G.654.D, it is prescribed that a mode field diameter (MFD) of a cutoff shift fiber at a wavelength of 1.55 μm is equal to or greater than 11.5 μm and equal to or less than 15.0 μm. In Recommendation G.654.D, it is prescribed that a bending loss of the cutoff shift fiber at a wavelength of 1.625 μm and a bending radius of 30 mm is equal to or less than 2.0 dB/100 turns and that a cutoff wavelength of the cutoff shift fiber is equal to or less than 1.53 μm.

Optical characteristics of an optical fiber which is used for a land core network of long-distance communication are prescribed in Recommendation G.654.E of the ITU-T. In Recommendation G.654.E, it is prescribed that the MFD of the optical fiber for the land core network at a wavelength of 1.55 μm is equal to or greater than 11.5 μm and equal to or less than 12.5 μm. In Recommendation G.654.E, it is prescribed that a bending loss of the optical fiber for the land core network at a wavelength of 1.625 μm and a bending radius of 30 mm is equal to or less than 0.1 dB/100 turns and that the cutoff wavelength of the optical fiber for the land core network is equal to or less than 1.53 μm.

A solid line (A) in FIG. 1 indicates a relationship between a radius a [μm] of a core and a relative refractive index difference Δ [%] of a clad from the core of a silica-core fiber of which an MFD is 11.5 μm as prescribed in Recommendation G.654.D. A solid line (B) in FIG. 1 indicates a relationship between a radius a and a relative refractive index difference Δ of a silica-core fiber of which a banding loss ab is 2.0 dB/100 turns. A solid line (C) in FIG. 1 indicates a relationship between a radius a of a core and a relative refractive index difference Δ of a silica-core fiber of which a cutoff wavelength $\lambda_c$ is 1.53 μm.

As indicated by an arrow in FIG. 1, an area in which conditions satisfying the prescriptions of Recommendation G.654.D, that is, conditions in which the MFD is equal to or greater than 11.5 μm, the bending loss ab is equal to or less than 2.0 dB/100 turns, and the cutoff wavelength $\lambda_c$ is equal to or greater than 1.53 μm, is an area in which a part in which the relative refractive index difference Δ is lower than that of the solid line (A) (that is, a part in which the relative refractive index difference Δ is close to 0 and an upper part in the graph of FIG. 1), a part in which the radius a is greater than that of the solid line (B), and a part in which the radius a is less than that of the solid line (C) overlap. It can be seen that a silica-core fiber having a structure satisfying the hatched part in FIG. 1 satisfies all the conditions required for an optical fiber for a long-distance communication network and has a core with a radius of 4.4 μm or more.

Dotted lines in FIG. 1 indicate relationships between the radius a and the relative refractive index difference Δ in silica-core fibers in which a group delay time (GD) (which may be simply referred to as a delay time) is 4.861 μs/km, 4.87 μs/km, 4.873 μs/km, 4.876 μs/km and 4.879 μs/km. In a silica-core fiber satisfying prescriptions of Recommendation G.654.E, a bending loss which is lower than that of a silica-core fiber satisfying the prescriptions of Recommendation G.654.D is required. An area satisfying the prescriptions of Recommendation G.654.E changes toward a part in which the radius a is greater than that of the hatched part in FIG. 1.

As can be seen from a position relative to the hatched part in FIG. 1, a minimum group delay time which can be achieved in a cutoff shifted fiber is 4.876 μs/km. It can also be seen that the group delay time which is achieved decreases as the radius a decreases. When the radius a is equal to or less than 4.4 μm, the bending loss increases and it is difficult to reduce the group delay time. A reason why it is difficult to reduce the group delay time is that the most electric field distribution of transmission light is confined to the core and the speed of the transmission light is dominantly determined according to a refractive index of silica-glass with high purity, which is a material of the core. In a silica-core fiber with a refractive index distribution other than a step index type which has been developed to enable simultaneous enlargement of the core and reduction in loss, an electric field distribution is confined well to the core and thus a delay time thereof is equal to that of a step index type silica-core fiber or less than that of the step index type silica-core fiber. An example of the refractive index distribution other than a step index type is a W-shaped refractive index distribution.

Figure 2:
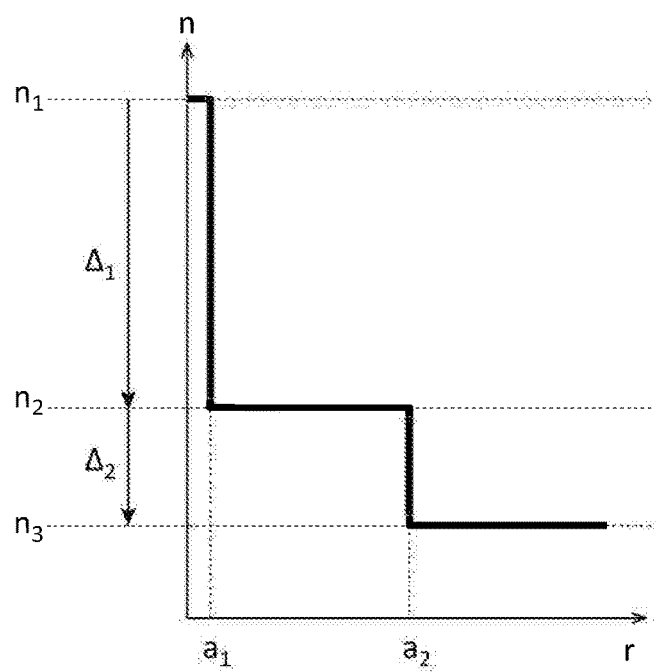
FIG. 2 is a diagram showing a refractive index distribution of a single-mode optical fiber (SMF) according to the invention.

A distribution of a refractive index n of a single-mode optical fiber (SMF) (an optical fiber) according to the invention is shown in FIG. 2. In the invention, an absolute value of a relative refractive index difference Δ is not used and the value is basically a negative value. An optical fiber according to the invention includes a core ($r \le a_1$), a first clad ($a_1 < r \le a_2$) and a second clad ($r > a_2$) in a direction overlapping the radius r from the center of a section crossing a longitudinal direction. That is, the first clad is provided on an outer circumferential portion of the core, and the second clad is provided on an outer circumferential portion of the first clad. A refractive index $n_1$ of the core is equivalent to a refractive index (a refractive index $n_{SiO2}$=1.444377 at a wavelength of 1.55 μm) of silica glass with high purity or equal to or less than the refractive index of silica glass with high purity. A refractive index $n_2$ of the first clad is less than the refractive index $n_1$. A refractive index $n_3$ of the second clad is less than the refractive index $n_2$.

In an SMF in which a radius $a_1$ is small, a delay time is expected to decrease and confinement of transmission light to the core is achieved by the second clad. Particularly, confinement of light of a first high-order mode having a characteristic in which an electric field distribution of light expands relatively has a small influence on transmission of light in the core. Accordingly, by designing the radius $a_1$ and a relative refractive index difference $\Delta_2$ of the second clad from the first clad as will be described later, a cutoff wavelength of the SMF according to the invention is optimized. On the other hand, a fundamental mode is affected by a refractive index distribution in the vicinity of the center of a section of an optical fiber. In consideration thereof, the MFD or the bending loss of the SMF according to the invention are appropriately set by adjusting the radii $a_1$ and $a_2$.

First Embodiment

Figure 3:
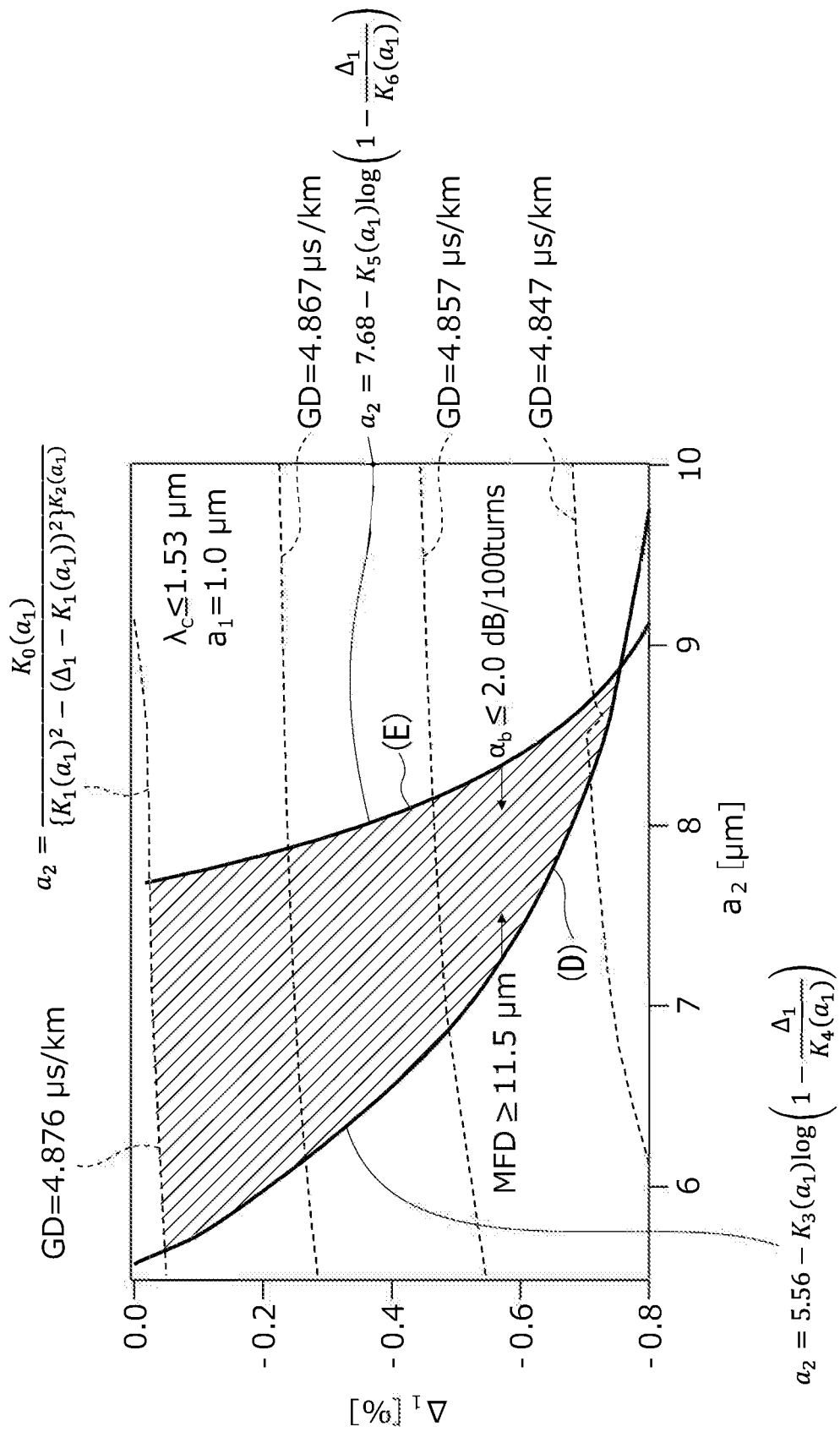
FIG. 3 is a graph showing conditions of a radius $a_2$ and a relative refractive index difference $\Delta_1$ of an optical fiber according to the invention in which all of a plurality of conditions in which a cutoff wavelength is 1.53 μm, an MFD is equal to or greater than 11.5 μm, a bending loss is equal to or less than 2 dB/100 turns, and a delay time is equal to or less than a delay time of a cutoff shift fiber are satisfied when a radius of a core is 1.0 μm.

A relationship between optical characteristics and a delay time in an SMF according to a first embodiment of the invention is shown in FIG. 3. A radius $a_1$ of an SMF according to the first embodiment is set to 1.0 μm. In consideration of a relative refractive index difference $\Delta_2$ [%] and a radius $a_2$, a cutoff wavelength of the SMF according to the first embodiment is set to be equal to or less than 1.53 μm. A solid line (D) in FIG. 3 represents a relationship between the radius $a_2$ and a relative refractive index difference $\Delta_1$ of the SMF according to the first embodiment in which an MFD is equal to or greater than 11.5 μm. A solid line (E) in FIG. 3 represents a relationship between the radius $a_2$ and the relative refractive index difference $\Delta_1$ of the SMF according to the first embodiment in which a bending loss is equal to or less than 2.0 dB/100 turns.

As can be seen from the result of comparison between FIGS. 1 and 3, the relative refractive index difference $\Delta_1$ of the SMF according to the first embodiment having a delay time (4.876 μs/km) equal to that of a cutoff shifted fiber according to the related art varies at a part in which the relative refractive index difference $\Delta_1$ increases with an increase of the radius $a_2$ (that is, a part in which the relative refractive index difference $\Delta_1$ moves away from 0 and a lower part in the graph of FIG. 3). The radius $a_2$ of the SMF according to the first embodiment having a delay time equal to that of the cutoff shift fiber is expressed by Equation (4) using functions $\kappa_0(a_1)$, $\kappa_1(a_1)$ and $\kappa_2(a_1)$ of the relative refractive index difference $\Delta_1$ and the radius $a_1$. In this specification, a function refers to a fitting function and arguments thereof may be omitted.

[Equation 4]

$$a_2 = \frac{K_0(a_i)}{\{K_1(a_1)^2 - (\Delta_1 - K_1(a_1))^2\}^{K_2(a_1)}} \quad (4)$$

As described above, when the radius $a_1$ of the SMF according to the first embodiment is 1.0 µm, the value of the function $\kappa_0(a_1)$ is 2.00, the value of the function $\kappa_1(a_1)$ is −1.42 and the value of the function $\kappa_2(a_1)$ is 0.50. As shown in FIG. 3, in a boundary (a solid line (D) in FIG. 3) of the SMF in which the MFD is equal to or greater than 11.5 µm, the radius $a_2$ when the relative refractive index difference $\Delta_1$ is 0.0% is 5.56 µm.

With an increase of the radius $a_2$, the influence of the first clad on the MFD decreases and the refractive index distribution of the SMF approaches that of the step index type. In this case, the MFD is determined according to only a structure (that is, parameters such as the radius $a_1$ or the refractive index $n_1$) of a core. Accordingly, the relative refractive index difference $\Delta_1$ converges on a value depending on the radius $a_1$ with an increase of the radius $a_2$. Accordingly, the radius $a_2$ at which the MFD of the SMF according to the first embodiment is 11.5 µm is expressed by Equation (5) using a function of $\kappa_3(a_1)$ of the relative refractive index difference $\Delta_1$ and the radius $a_1$ and a function $\kappa_4(a_1)$ in which the relative refractive index difference $\Delta_1$ converges with an increase of the radius $a_2$.

[Equation 5]

$$a_2 = 5.56 + K_3(a_1)\log\left(1 - \frac{\Delta_1}{K_4(a_1)}\right) \quad (5)$$

When the radius $a_1$ of the SMF according to the first embodiment is 1.0 µm, the value of the function $\kappa_3(a_1)$ is −3.94 and the value of the function $\kappa_4(a_1)$ is −0.88. As shown in FIG. 3, in a boundary (the solid line (E) in FIG. 3) of the SMF in which the bending loss is equal to or less than 2.0 dB/100 turns, when the relative refractive index difference $\Delta_1$ is 0.0%, the radius $a_2$ is 7.68 µm.

When the refractive index distribution of the SMF approaches a simple step index type with an increase of the radius $a_2$ as described above, the bending loss is also determined according to only the structure of the core. Since the relative refractive index difference $\Delta_1$ converges on the value determined according to the radius $a_1$ with an increase of the radius $a_2$, the radius $a_2$ in which the bending loss SMF is 2.0 dB/100 turns is expressed by Equation (6) using functions of $\kappa_5(a_1)$ and $\kappa_6(a_1)$ of the relative refractive index difference $\Delta_1$ and the radius $a_1$.

[Equation 6]

$$a_2 = 7.68 + K_5(a_1)\log\left(1 - \frac{\Delta_1}{K_6(a_1)}\right) \quad (6)$$

When the radius $a_1$ of the SMF according to the first embodiment is 1.0 µm, the value of the function $\kappa_5(a_1)$ is −1.08 and the value of the $\kappa_6(a_1)$ is −0.82.

A hatched part in FIG. 3 represents a design area of the SMF according to the first embodiment which satisfies the prescriptions of Recommendation G.654.D and which can realize a delay time (4.876 µs/km) equal to or less than that of the cutoff shifted fiber.

As described above, a selection range of the radius $a_2$ with respect to the relative refractive index difference $\Delta_1$ is limited by the conditions of the delay time, the MFD, and the bending loss. By employing the structure corresponding to the hatched part of FIG. 3, the SMF according to the first embodiment realizes optical characteristics equal to those of a cutoff shift fiber according to the related art and realizes a delay time equal to or less than the delay time of the cutoff shift fiber. As the relative refractive index difference $\Delta_1$ decreases, the delay time of the SMF according to the first embodiment decreases.

Figure 4:
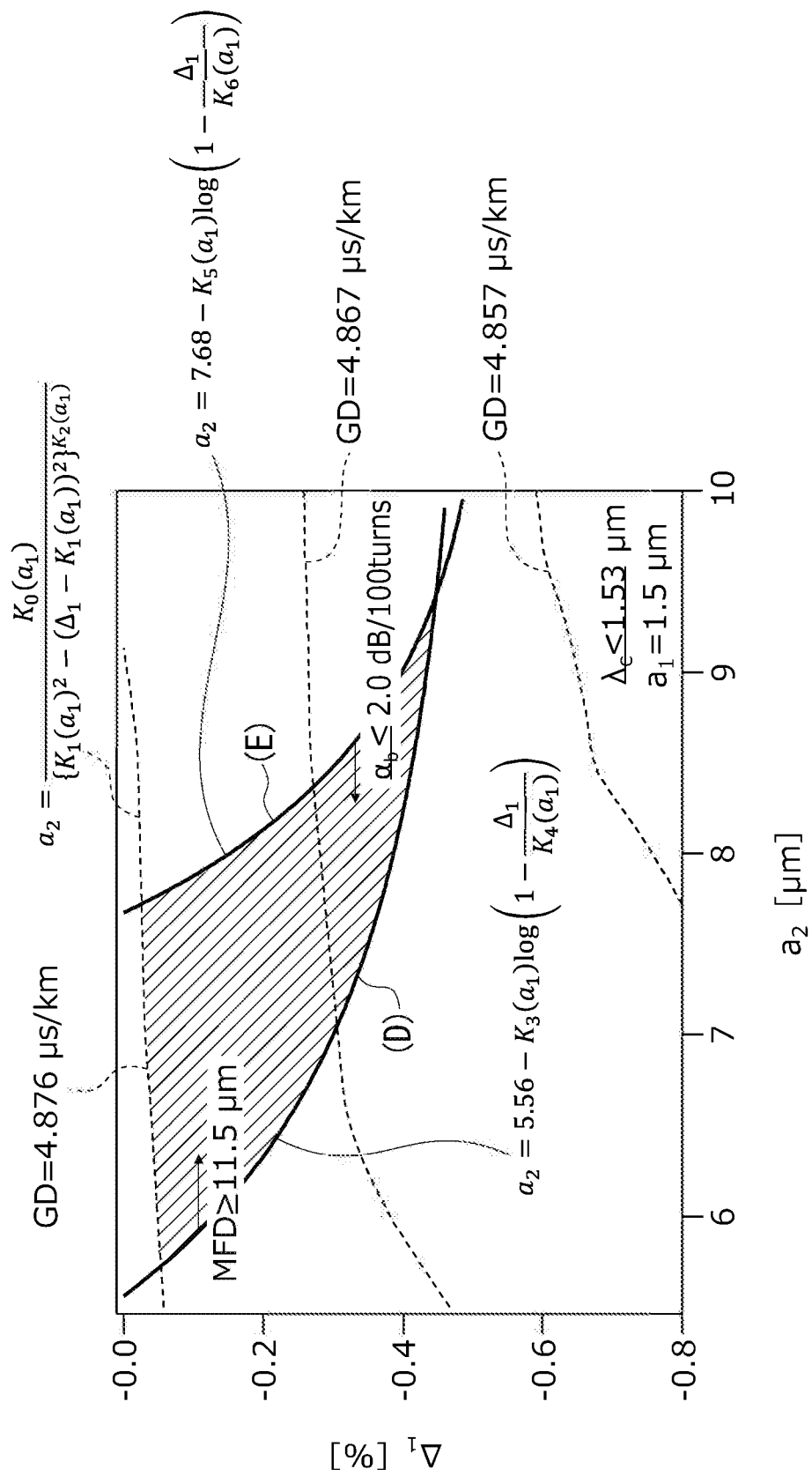
FIG. 4 is a graph showing conditions of the radius $a_2$ and the relative refractive index difference $\Delta_1$ of the optical fiber according to the invention in which all of the plurality of conditions in which the cutoff wavelength is 1.53 μm, the MFD is equal to or greater than 11.5 μm, the bending loss is equal to or less than 2 dB/100 turns, and the delay time is equal to or less than the delay time of the cutoff shifted fiber are satisfied when the radius of the core is 1.5 μm.

A relationship between the radius $a_2$ and the relative refractive index difference $\Delta_1$ in the SMF according to the first embodiment of the invention in which the radius $a_1$ is 1.5 µm is shown in FIG. 4. Solid lines (D) and (E) in FIGS. 4, 5 and FIGS. 9 to 11 which will be described later represent the same details as the solid lines (D) and (E) in FIG. 3. A boundary of a selection range of the radius $a_2$ with respect to the relative refractive index difference $\Delta_1$ in the SMF in which the delay time is equal to or less than the delay time of a cutoff shifted fiber is expressed by Equation (4). A boundary of a selection range of the radius $a_2$ with respect to the relative refractive index difference $\Delta_1$ in the SMF in which the MFD is equal to or greater than 11.5 µm is expressed by Equation (5). A boundary of a selection range of the radius $a_2$ with respect to the relative refractive index difference $\Delta_1$ in the SMF in which the bending loss is equal to or less than 2.0 dB/100 turns is expressed by Equation (6). When the radius $a_1$ is 1.5 µm, the value of the function $\kappa_2(a_1)$ is 2.00, the value of function $\kappa_1(a_1)$ is −0.86, the value of the function $\kappa_2(a_1)$ is 0.43, the value of the function $\kappa_3(a_1)$ is −3.94 and the value of the function $\kappa_4(a_1)$ is −0.50. The hatched part in FIG. 4 represents a design area of the SMF according to the first embodiment satisfying the prescriptions of Recommendation G.654.D.

Figure 5:
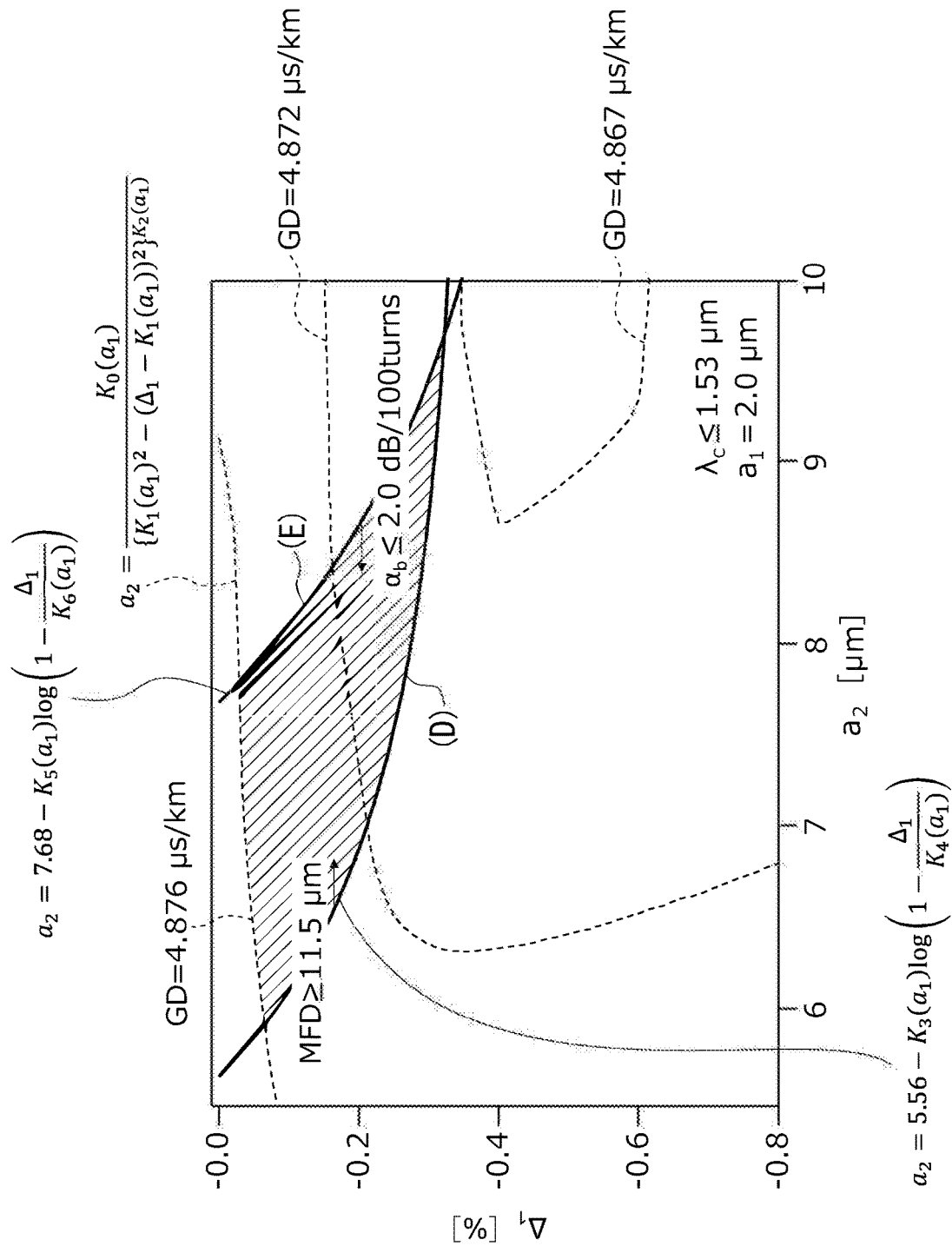
FIG. 5 is a graph showing conditions of the radius $a_2$ and the relative refractive index difference $\Delta_1$ of the optical fiber according to the invention in which all of the plurality of conditions in which the cutoff wavelength is 1.53 μm, an MFD is equal to or greater than 11.5 μm, the bending loss is equal to or less than 2 dB/100 turns, and the delay time is equal to or less than the delay time of the cutoff shift fiber are satisfied when the radius of the core is 2.0 μm.

A relationship between the radius $a_2$ and the relative refractive index difference $\Delta_1$ of the first clad in the SMF according to the first embodiment of the invention in which the radius $a_1$ of the core area is 2.0 µm is shown in FIG. 5. A boundary of a structure in which the delay time is equal to or less than the delay time of the cutoff shift fiber is expressed by Equation (4) described above. A boundary of a structure in which the MFD is equal to or greater than 11.5 µm is expressed by Equation (5) described above. A boundary of a structure in which the bending loss is equal to or less than 2.0 dB/100 turns is expressed by Equation (6). When the radius $a_1$ of the core area is 2.0 µm, the value of the function $\kappa_0(a_1)$ is 2.00, the value of function $\kappa_1(a_1)$ is −0.50, the value of the function $\kappa_2(a_1)$ is 0.38, the value of the function $\kappa_3(a_1)$ is −3.94 and the value of the function $\kappa_4(a_1)$ is −0.36. The hatched part in FIG. 5 represents a design area of the SMF satisfying the prescriptions of Recommendation G.654.D of the ITU-T by the single-mode optical fiber according to the invention.

As shown in FIGS. 3 to 5, the relative relationship between the relative refractive index difference $\Delta_1$ and the radius $a_2$ varies depending on the radius $a_1$. The design area of the SMF according to the first embodiment is specified by expressing the coefficients of the functions representing the boundaries surrounding the hatched parts in FIGS. 3 to 5 as the functions of the radius $a_1$. The invention is based on the premise that the radius $a_1$ is equal to or greater than 1.0 μm in consideration of conditions for easily manufacturing the optical fiber.

Figure 6:
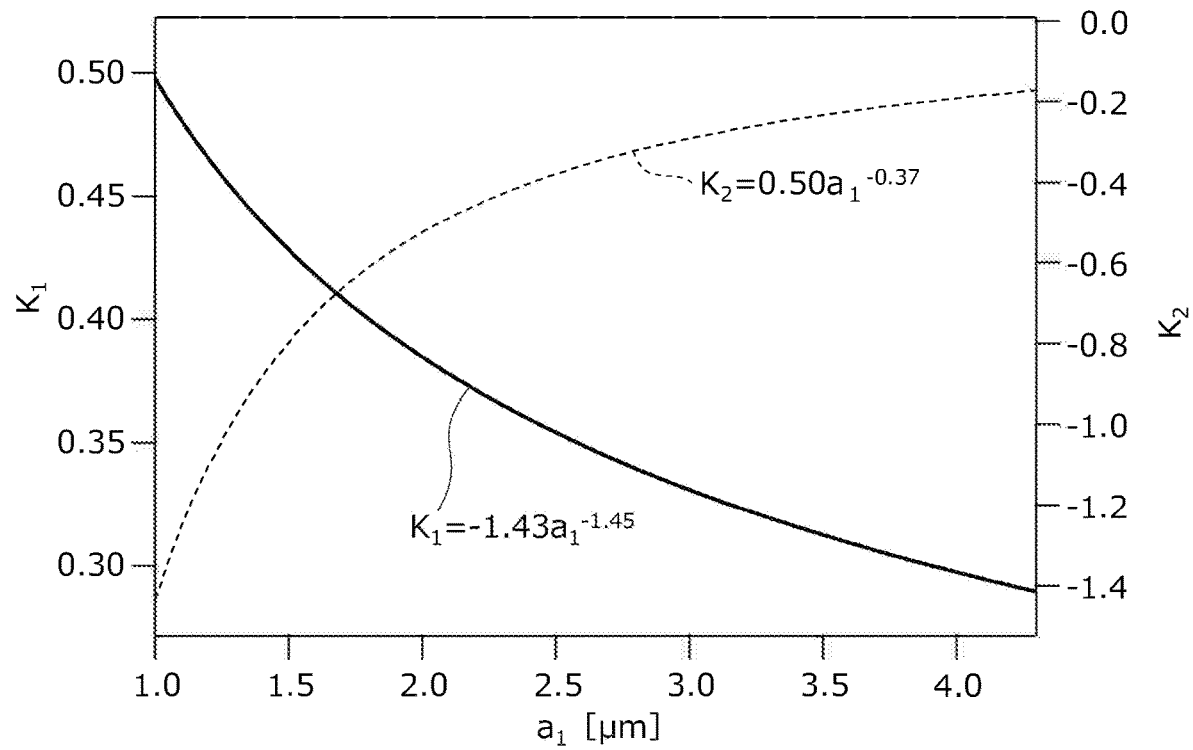
FIG. 6 is a graph showing a relationship between a fitting coefficient of the delay time and a radius of a core of an SMF according to the invention in which predetermined required conditions are satisfied.

In the boundary (that is, the boundary expressed by Equation (1)) of the structure in the SMF in which the delay time equal to or less than the delay time of the cutoff shift fiber is achieved, the value of the function $\kappa_0(a_1)$ is 2.00 regardless of the radius $a_1$ of the core area. A relationship between the values of the functions $\kappa_1(a_1)$ and $\kappa_2(a_1)$ and the radius $a_1$ is shown in FIG. 6. As shown in FIG. 6, the function $\kappa_1(a_1)$ is expressed by Equation (7) and the function $\kappa_2(a_1)$ is expressed by Equation (8).

[Equation 7]

$$K_1 = -1.43 a_1^{-1.45} \quad (7)$$

[Equation 8]

$$K_2 = -0.50 a_1^{-0.37} \quad (8)$$

By expressing the boundary of the structure in which the delay time is 4.876 μs/km using the radius $a_1$, the relative refractive index difference $\Delta_1$ and the radius $a_2$, the design area (that is, an area representing optical characteristics) of the SMF according to the first embodiment is expressed by Equation (1).

[Equation 9]

$$a_2 \geq 2\{(1.43 a_1^{-1.45})^2 - (\Delta_1 + 1.43 a_1^{-1.45})^2\}^{-0.50 a_1^{-0.37}} \quad (1)$$

Figure 7:
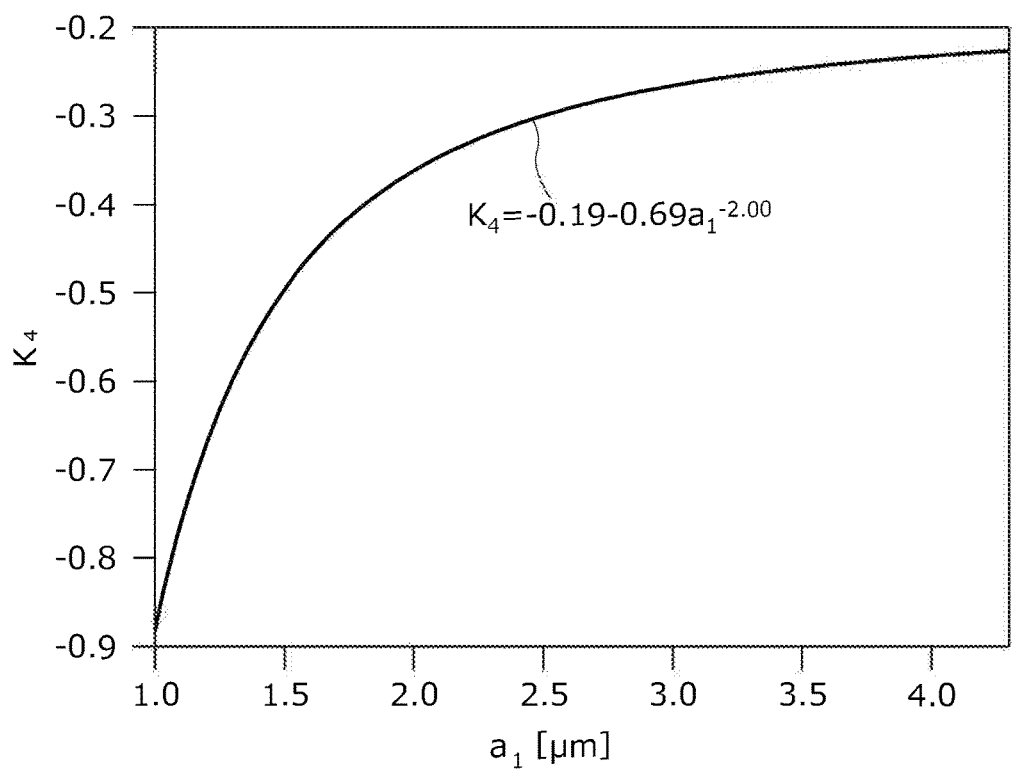
FIG. 7 is a graph showing a relationship between a fitting coefficient of a MFD and the radius of the core of the SMF according to the invention in which predetermined required conditions are satisfied.

In the boundary (the boundary expressed by Equation (5)) of the structure in which the MFD is equal to or greater than 11.5 μm, the value of the function $\kappa_3(a_1)$ is −3.94 regardless of the radius $a_1$. A relationship between the value of the function $\kappa_4(a_1)$ and the radius $a_1$ is shown in FIG. 7. As shown in FIG. 7, the function $\kappa_4(a_1)$ is expressed by Equation (10).

[Equation 10]

$$K_4 = -0.19 - 0.69 a_1^{-2.00} \quad (10)$$

By expressing the boundary of the structure in which the MFD is 11.5 μm using the radius $a_1$, the relative refractive index difference $\Delta_1$ and the radius $a_2$, the design area of the SMF according to the first embodiment is expressed by Equation (11).

[Equation 11]

$$a_2 \geq 5.56 - 3.94 \log\left(1 + \frac{\Delta_1}{0.19 + 0.69 a_1^{-2.00}}\right) \quad (11)$$

Figure 8:
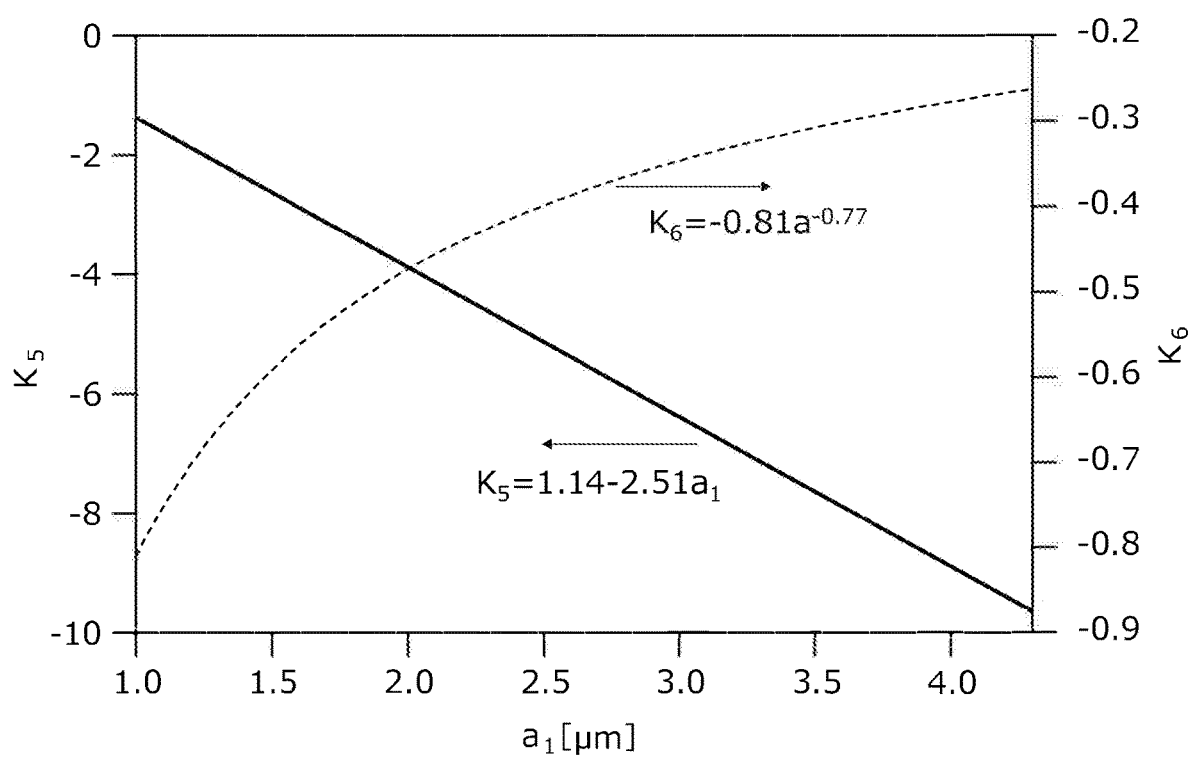
FIG. 8 is a graph showing a relationship between a fitting coefficient of a bending loss and the radius of the core of the SMF in the invention in which predetermined required conditions are satisfied.

Regarding the boundary of the structure (the boundary expressed by Equation (6)) in which the bending loss is equal to or less than 2.0 dB/100 turns, a relationship between the values of the functions $\kappa_5(a_1)$ and $\kappa_6(a_1)$ and the radius $a_1$ is shown in FIG. 8. As shown in FIG. 8, the function $\kappa_5(a_1)$ is expressed by Equation (12) and the function $\kappa_6(a_1)$ is expressed by Equation (13).

[Equation 12]

$$K_5 = 1.14 - 2.51 a_1 \quad (12)$$

[Equation 13]

$$K_6 = -0.81 a_1^{-0.77} \quad (13)$$

By expressing the boundary of the structure in which the bending loss is 2.0 dB/100 turns using the radius $a_1$, the relative refractive index difference $\Delta_1$ and the radius $a_2$, the design area of the SMF according to the first embodiment is expressed by Equation (9).

[Equation 14]

$$a_2 \leq 7.68 + (1.14 - 2.51 a_1) \log\left(1 + \frac{\Delta_1}{0.81 a_1^{-0.77}}\right) \quad (9)$$

Based on the above description, the SMF according to the first embodiment includes a core of which the radius $a_1$ is equal to or greater than 1.0 μm and equal to or less than 4.3 μm, and satisfies Equation (1) described above and Equation (2) described below as the relationship between the radius $a_2$ and the relative refractive index difference $\Delta_1$.

[Equation 15]

$$5.56 - 3.94 \log\left(1 + \frac{\Delta_1}{0.19 + 0.69 a_1^{-2.00}}\right) \leq \quad (2)$$

$$a_2 \leq 7.68 + (1.14 - 2.51 a_1) \log\left(1 + \frac{\Delta_1}{0.81 a_1^{-0.77}}\right)$$

When the radius $a_1$ and the radius $a_2$ with respect to the relative refractive index difference $\Delta_1$ satisfy the above-mentioned conditions, the SMF according to the first embodiment realizes the same optical characteristics as those of the cutoff shifted fiber and realizes the delay time which is equal to or less than the delay time of the cutoff shifted fiber.

Table 1 shows an example of design parameters of the SMF according to the first embodiment. In the design shown in Table 1, the same optical characteristics as those of the cutoff shift fiber are achieved and a reduction in the delay time of 0.05 μs/km is achieved. By using the SMF designed as described above, a reduction in delay time of about 1 ms is achieved in a long-distance network of which the network length amounts to about 10000 km such as a submarine optical cable crossing the Pacific Ocean. The design parameters shown in Table 1 are an example satisfying the above-mentioned conditions and the same advantageous effects as in the SMF having the design parameters shown in Table 1 are achieved by the SMF having the structure satisfying the above-mentioned conditions.

TABLE 1

| Structure parameter | | Optical characteristics | |
|---|---|---|---|
| $a_1$ | 1.0 μm | MFD@λ = 1.55 μm | 11.8 μm |
| $a_2$ | 8.5 μm | $\lambda_c$ | 1.53 μm |
| $\Delta_1$ | −0.70% | $\alpha_b$@1.625 μm R = 30 mm | 1.2 dB/100 turns |
| $\Delta_2$ | −0.17% | GD@1.55 μm | 4.847 μs/km |

Second Embodiment

Figure 9:
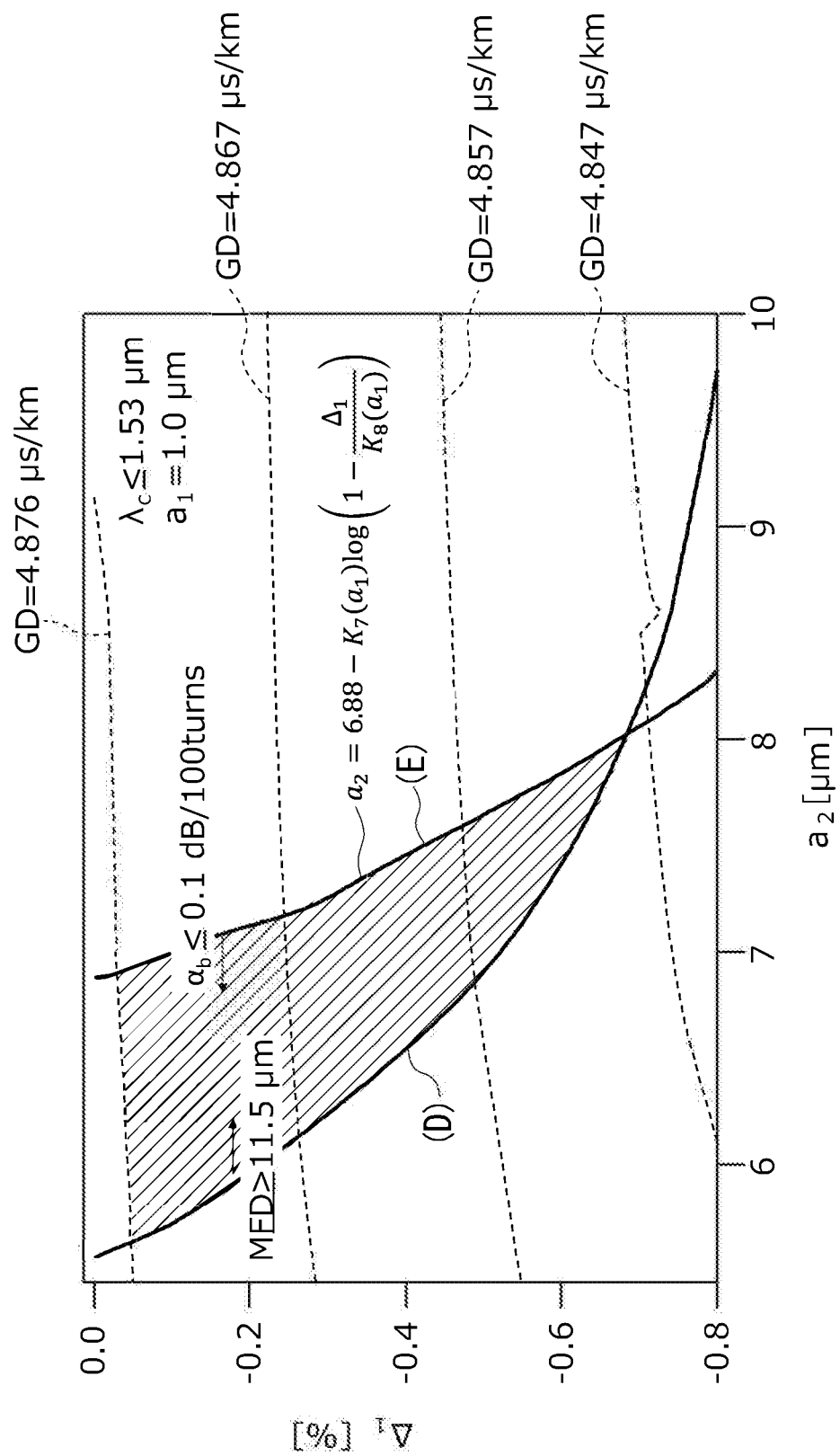
FIG. 9 is a graph showing conditions of a radius $a_2$ and a relative refractive index difference $\Delta_1$ of an optical fiber according to the invention in which all of a plurality of conditions in which a cutoff wavelength is 1.53 μm, an MFD is equal to or greater than 11.5 μm and equal to or less than 12.5 μm, a bending loss is equal to or less than 2 dB/100 turns and a delay time is equal to or less than a delay time of a cutoff shift fiber are satisfied when a radius of a core is 1.0 μm.

A relationship between the radius $a_2$ and the relative refractive index difference $\Delta_1$ when the radius $a_1$ is 1.0 μm and a design area of an SMF according to a second embodiment of the invention satisfies Recommendation G.654.E is shown in FIG. 9. In consideration of the relative refractive index difference $\Delta_2$ and the radius $a_2$, the cutoff wavelength of the SMF according to the second embodiment is set to be equal to or less than 1.53 µm. A solid line (D) in FIG. 9 represents a boundary of a structure in which the MFD is 11.5 µm similarly to the first embodiment. A solid line (E) in FIG. 9 represents a boundary of a structure in which the bending loss is equal to or less than 0.1 dB/100 turns similarly to the first embodiment. A hatched part in FIG. 9 represents a design area in which all the above-mentioned conditions with respect to the cutoff wavelength, the MFD, and the bending loss are satisfied and the delay time (equal to or less than 4.876 µs/km) which is equal to or less than the delay time of the cutoff shifted fiber can be realized.

When the radius $a_1$ is 1.0 µm, the boundary in which the delay time is equal to or less than the delay time of the cutoff shifted fiber is expressed by Equation (4) similarly to the first embodiment. The values of the functions $\kappa_0(a_1)$, $\kappa_1(a_1)$ and $\kappa_2(a_1)$ are equal to the values of the functions $\kappa_0(a_1)$, $\kappa_1(a_1)$ and $\kappa_2(a_1)$ described above in the first embodiment. The boundary in which the MFD is equal to or greater than 11.5 µm is expressed by Equation (5). The values of the functions $\kappa_3(a_1)$ and $\kappa_4(a_1)$ are equal to the values of the functions $\kappa_3(a_1)$ and $\kappa_4(a_1)$ described above in the first embodiment.

In the boundary of the structure in which the bending loss is equal to or less than 0.1 dB/100 turns, when the relative refractive index difference $\Delta_1$ is 0.0%, the radius $a_2$ is 6.88 µm. As the radius $a_2$ increases, the influence of the first clad on the bending loss decreases and the bending loss is determined according to only the structure of the core area. With the increase of the radius $a_2$, the relative refractive index difference $\Delta_1$ converges on a value which is determined according to the radius $a_1$ of the core area. Accordingly, the radius $a_2$ at which the bending loss is 0.1 dB/100 turns in the SMF according to the invention is expressed by Equation (14) using the functions $\kappa_7(a_1)$ and $\kappa_8(a_1)$ of the relative refractive index difference $\Delta_1$ and the radius $a_1$.

[Equation 16]

$$a_2 = 6.68 - K_7(a_1)\log\left(1 - \frac{\Delta_1}{K_8(a_1)}\right) \quad (14)$$

When the radius $a_1$ is 1.0 µm, the value of the function $\kappa_7(a_1)$ is −3.74 and the value of the function $\kappa_8(a_1)$ is −1.36. The design area in which the relative refractive index difference $\Delta_1$ is high is limited by an increase of the delay time. Design ranges of the MFD and the radius $a_2$ are limited by required conditions of the bending loss. As shown in FIG. 9, the delay time decreases as the relative refractive index difference $\Delta_1$ decreases.

Figure 10:
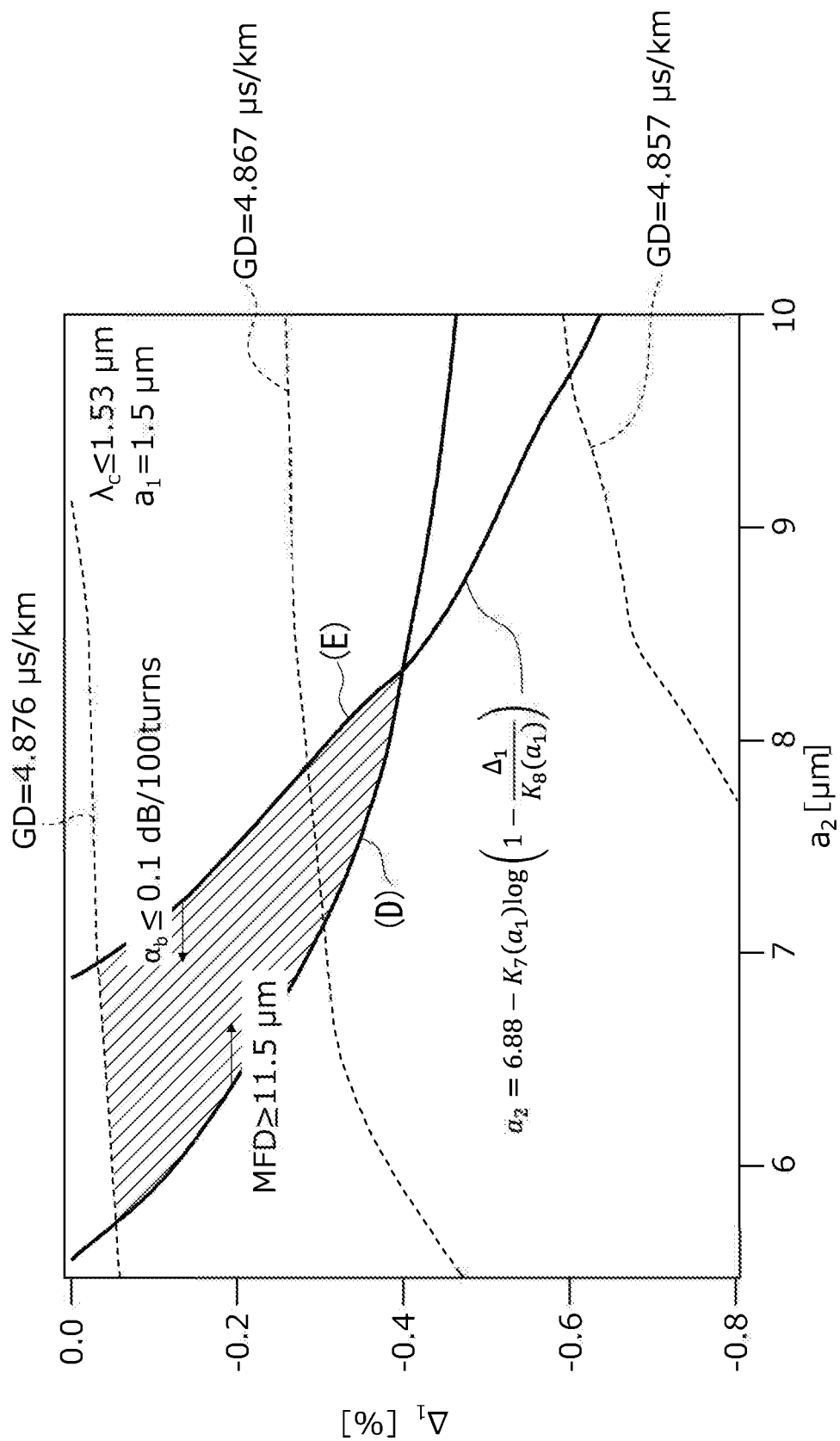
FIG. 10 is a graph showing conditions of the radius $a_2$ and the relative refractive index difference $\Delta_1$ of the optical fiber according to the invention in which all of a plurality of conditions in which the cutoff wavelength is 1.53 μm, the MFD is equal to or greater than 11.5 μm and equal to or less than 12.5 μm, the bending loss is equal to or less than 2 dB/100 turns and the delay time is equal to or less than the delay time of the cutoff shift fiber are satisfied when the radius of the core is 1.5 μm.

A relationship between the radius $a_2$ and the relative refractive index difference $\Delta_1$ when the radius $a_1$ is 1.5 µm and a design area of the SMF according to the second embodiment satisfying Recommendation G.654.E is shown in FIG. 10. Even when the radius $a_1$ is 1.5 µm, the boundary in which the delay time is equal to or less than the delay time of the cutoff shift fiber is expressed by Equation (4). The values of the functions $\kappa_0(a_1)$, $\kappa_1(a_1)$ and $\kappa_2(a_1)$ are equal to the values of the functions $\kappa_0(a_1)$, $\kappa_1(a_1)$, and $\kappa_2(a_1)$ described above in the first embodiment. The boundary in which the MFD is equal to or greater than 11.5 µm is expressed by Equation (5). The values of the functions $\kappa_3(a_1)$ and $\kappa_4(a_1)$ are equal to the values of the functions $\kappa_3(a_1)$ and $\kappa_4(a_1)$ described above in the first embodiment.

The boundary of the structure in which the bending loss is equal to or less than 0.1 dB/100 turns is expressed by Equation (14). Since the radius $a_1$ is 1.5 µm, the value of the function $\kappa_7(a_1)$ is −5.60 and the value of the function $\kappa_8(a_1)$ is −0.87. The hatched part in FIG. 10 represents a design area in which all the above-mentioned conditions with respect to the cutoff wavelength, the MFD and the bending loss are satisfied and the delay time equal to or less than the delay time of the cutoff shifted fiber is achieved.

Figure 11:
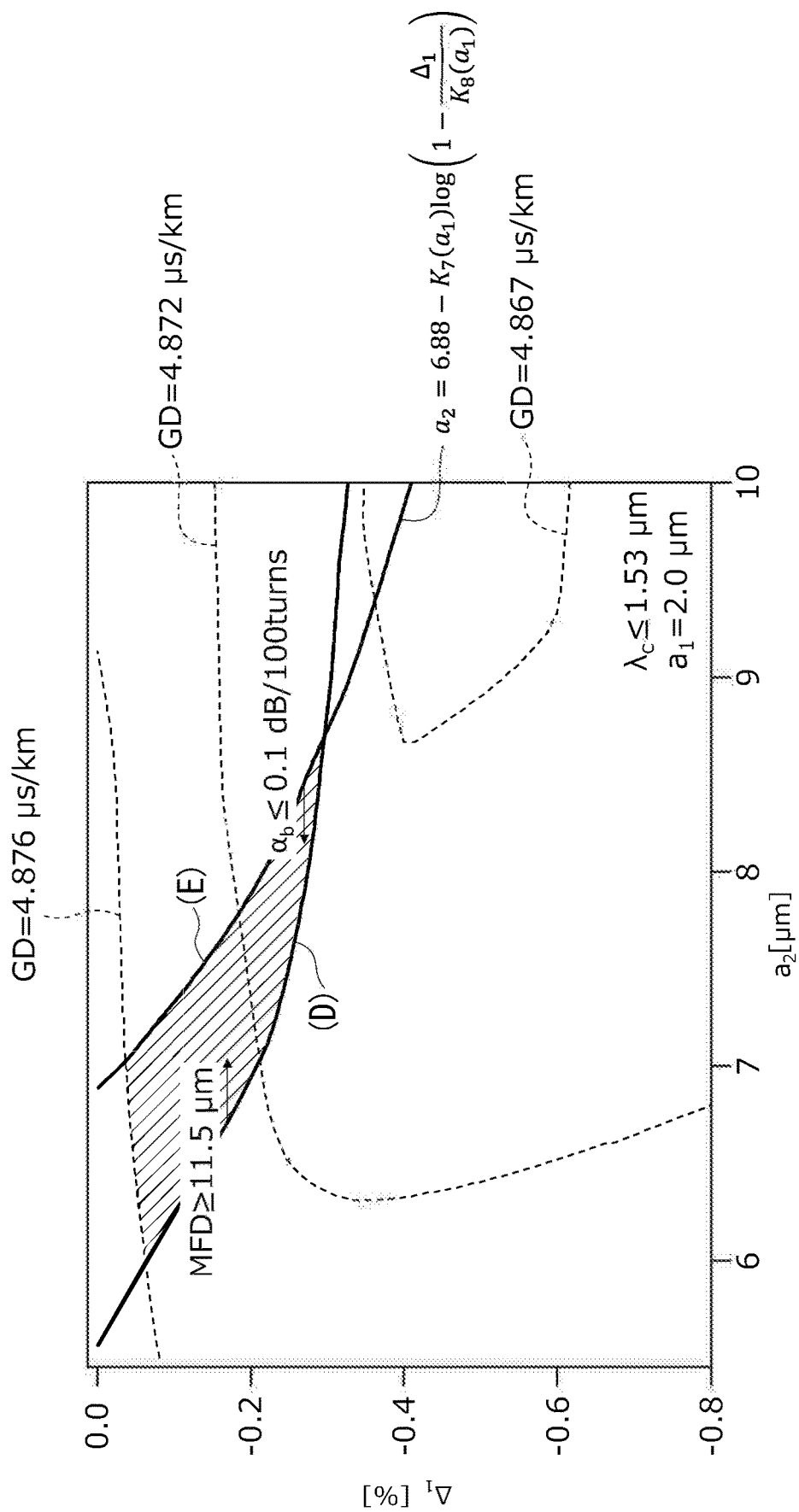
FIG. 11 is a graph showing conditions of the radius $a_2$ and the relative refractive index difference $\Delta_1$ of the optical fiber according to the invention in which all of a plurality of conditions in which the cutoff wavelength is 1.53 μm, the MFD is equal to or greater than 11.5 μm and equal to or less than 12.5 μm, the bending loss is equal to or less than 2 dB/100 turns and the delay time is equal to or less than the delay time of the cutoff shift fiber are satisfied when the radius of the core is 2.0 μm.

A relationship between the radius $a_2$ and the relative refractive index difference $\Delta_1$ when the radius $a_1$ is 2.0 µm and a design area of the SMF according to the second embodiment satisfying Recommendation G.654.E is shown in FIG. 11. Even when the radius $a_1$ is 2.0 µm, the boundary in which the delay time is equal to or less than the delay time of the cutoff shifted fiber is expressed by Equation (4). The values of the functions $\kappa_0(a_1)$, $\kappa_1(a_1)$ and $\kappa_2(a_1)$ are equal to the values of the functions $\kappa_0(a_1)$, $\kappa_1(a_1)$, and $\kappa_2(a_1)$ described above in the first embodiment. The boundary in which the MFD is equal to or greater than 11.5 µm is expressed by Equation (5). The values of the functions $\kappa_3(a_1)$ and $\kappa_4(a_1)$ are equal to the values of the functions $\kappa_3(a_1)$ and $\kappa_4(a_1)$ described above in the first embodiment.

The boundary of the structure in which the bending loss is equal to or less than 0.1 dB/100 turns is expressed by Equation (14). Since the radius $a_1$ is 2.0 µm, the value of the function $\kappa_7(a_1)$ is −6.25 and the value of the function $\kappa_8(a_1)$ is −0.61. The hatched part in FIG. 11 represents a design area in which all the above-mentioned conditions associated with the cutoff wavelength, the MFD and the bending loss are satisfied and the delay time equal to or less than the delay time of the cutoff shift fiber is achieved.

As shown in FIGS. 9 to 11, the relative relationship between the relative refractive index difference $\Delta_1$ and the radius $a_2$ depends on the radius $a_1$. The boundaries in which the MFD is equal to or greater than 11.5 µm and which are shown in FIGS. 9 to 11 are the same as the boundaries which are shown in FIGS. 3 to 5. The structure of the SMF in which the MFD is equal to or greater than 11.5 µm is expressed by Equation (9). The boundaries in which the delay time is equal to or less than the delay time of the cutoff shift fiber and which are shown in FIGS. 9 to 11 are the same as the boundaries which are shown in FIGS. 3 to 5. The structure of the SMF in which the delay time is equal to or less than the delay time of the cutoff shift fiber is expressed by Equations (9) and (11).

Figure 12:
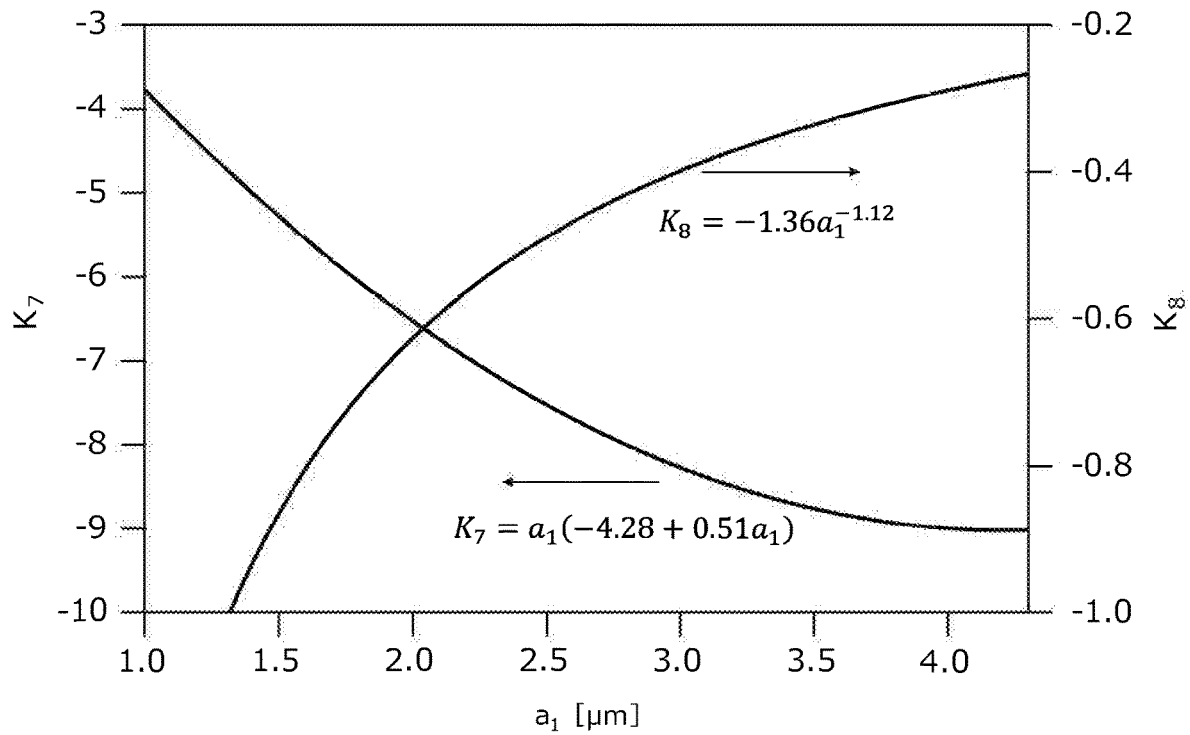
FIG. 12 is a graph showing a relationship between a fitting coefficient of a bending loss and a radius of a core of the SMF according to the invention in which predetermined required conditions are satisfied.

The boundary of the structure in which the bending loss is equal to or less than 0.1 dB/100 turns is expressed by Equation (14). Variations of the function $\kappa_7$ (the left axis in FIG. 12) and the function $\kappa_8$ (the right axis in FIG. 12) with respect to the radius $a_1$ are shown in FIG. 12. As shown in FIG. 12, the function $\kappa_7(a_1)$ is expressed by Equation (15) and the function $\kappa_8(a_1)$ is expressed by Equation (16).

[Equation 17]

$$K_7 = a_1(-4.28 + 0.51a_1) \quad (15)$$

[Equation 18]

$$K_8 = -1.36 a_1^{-1.12} \quad (16)$$

As described above, the design area of the radius $a_2$ of the SMF according to the second embodiment in which the bending loss is equal to or less than 0.1 dB/100 turns is expressed by Equation (17).

[Equation 19]

$$a_2 \leq 6.68 + a_1(-4.28 + 0.51a_1)\log\left(1 + \frac{\Delta_1}{1.36a_1^{-1.12}}\right) \quad (17)$$

As described above, the SMF according to the second embodiment includes a core in which the radius $a_1$ is equal to or greater than 1.0 µm and equal to or less than 4.3 µm and includes a design area in which Equations (1) and (2) are satisfied as the relationship between the radius $a_2$ and the relative refractive index difference $\Delta_1$.

[Equation 1]

$$a_2 \geq 2\{(1.43a_1^{-1.45})^2 - (\Delta_1 + 1.43a_1^{-1.45})^2\}^{-0.50a_1^{-0.37}} \quad (1)$$

[Equation 2]

$$5.56 - 3.94\log\left(1 + \frac{\Delta_1}{0.19 + 0.69a_1^{-2.00}}\right) \leq$$
$$a_2 \leq 6.68 + a_1(-4.28 + 0.51a_1)\log\left(1 + \frac{\Delta_1}{1.36a_1^{-1.12}}\right) \quad (2)$$

When the radius $a_1$ and the radius $a_2$ with respect to the relative refractive index difference $\Delta_1$ satisfy the above-mentioned conditions, the SMF according to the second embodiment achieves the same optical characteristics as the cutoff shift fiber and achieves a delay time equal to or less than the delay time of the cutoff shift fiber.

Figure 13:
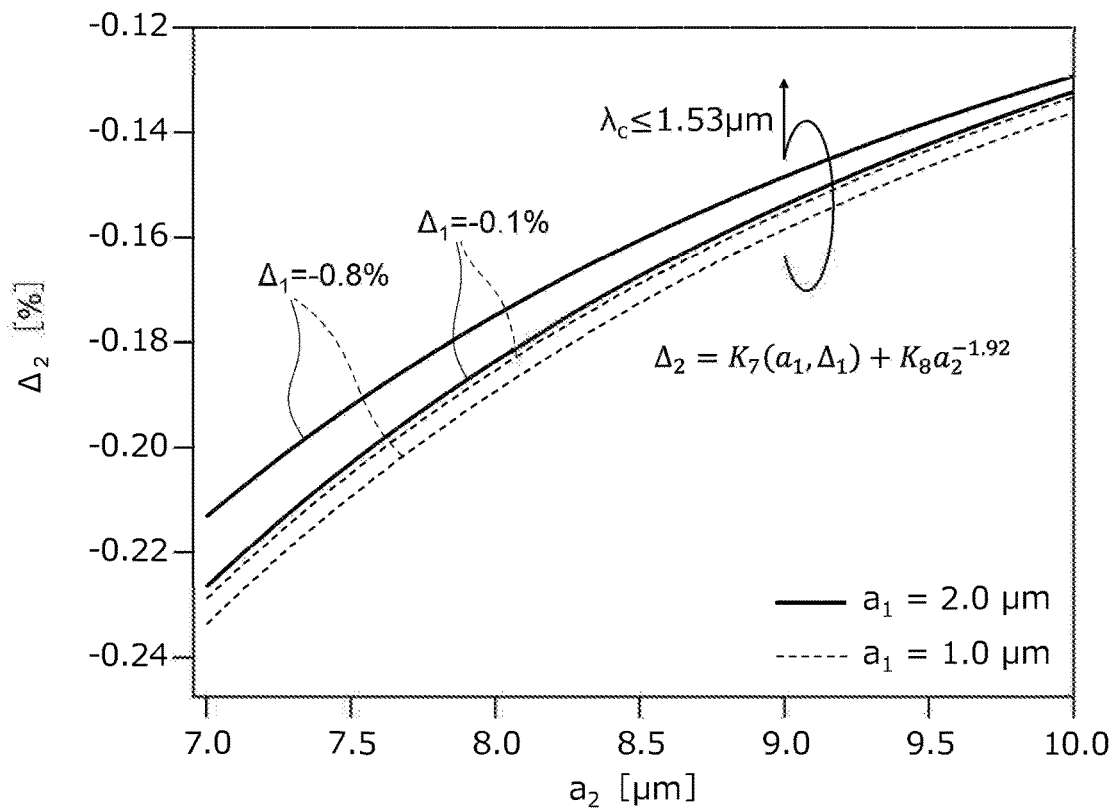
FIG. 13 is a graph showing a relationship between the radius $a_2$ and the relative refractive index difference $\Delta_1$ of the SMF according to the invention in which the cutoff wavelength is equal to or less than 1.53 μm.

In FIG. 13, when the radius $a_1$ of the core area is 1.0 µm and when the radius $a_1$ of the core area is 2.0 µm, boundaries in which the cutoff wavelength is equal to or less than 1.53 µm with respect to the radius $a_2$ and the relative refractive index difference $\Delta_2$ when the relative refractive index difference $\Delta_1$ is set to −0.1% and the relative refractive index difference $\Delta_1$ is set to −0.8% are shown. In a part in which the relative refractive index difference $\Delta_2$ is lower than the boundaries (that is a part in which the relative refractive index difference $\Delta_2$ approaches 0 and an upper part in the graph which is shown in FIG. 13), the above-mentioned required conditions with respect to the cutoff wavelength, the MFD and the bending loss are satisfied. As shown in FIG. 9, the boundary in which the cutoff wavelength is equal to or less than 1.53 µm varies depending on the radius $a_1$ of the core and the relative refractive index difference $\Delta_1$. Accordingly, the relative refractive index difference $\Delta_2$ in which the cutoff wavelength is 1.53 µm is expressed by the radius $a_1$, the relative refractive index difference $\Delta_1$ and the radius $a_2$.

When the radius $a_2$ increases, the boundary in which the cutoff wavelength is 1.53 µm varies to a part in which the relative refractive index difference $\Delta_2$ is low. When the radius $a_2$ increases, an influence of the structure of the core on the cutoff wavelength decreases and the relative refractive index difference $\Delta_2$ converges regardless of the radius $a_1$ and the relative refractive index difference $\Delta_1$. The converging value of the relative refractive index difference $\Delta_2$ is −0.033%. When the converging value of the relative refractive index difference $\Delta_2$ and the functions $\kappa_9(a_1, \Delta_1)$ and $\kappa_{10}(a_1, \Delta_1)$ with the radius $a_1$ and the relative refractive index difference $\Delta_1$ as variables, the relative refractive index difference $\Delta_2$ in which the cutoff wavelength is 1.53 µm is expressed by Equation (20).

[Equation 20]

$$\Delta_2 = -0.033 + K_9(a_0, \Delta_1)a_2^{K_{10}(a_1, \Delta_1)} \quad (20)$$

Figure 14:
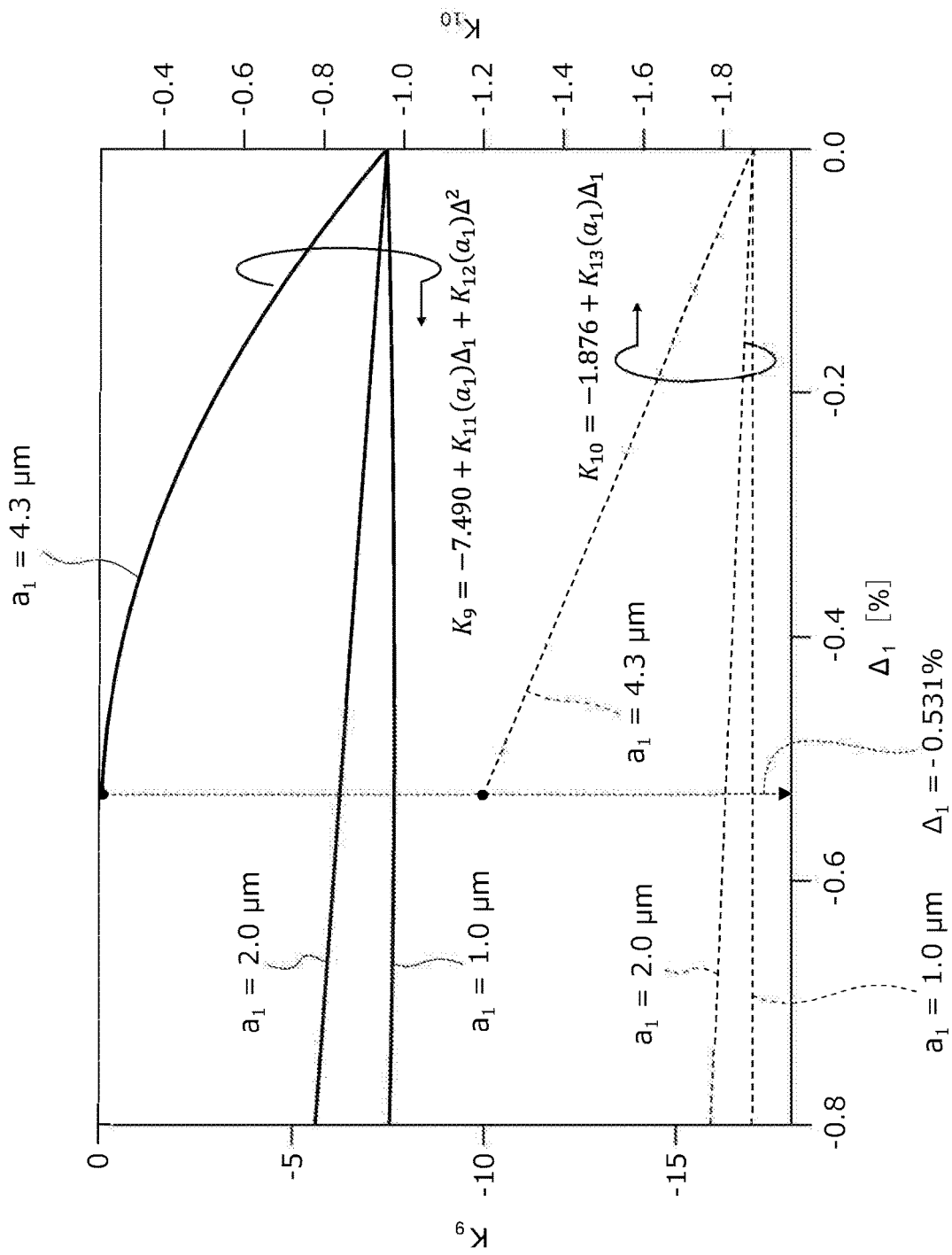
FIG. 14 is a graph showing a relationship between fitting coefficients $\kappa_9$ and $\kappa_{10}$ of the cutoff wavelength, a radius $a_1$ of a core and a relative refractive index difference $\Delta_1$ of a first clad from a core area of the SMF according to the invention.

Variations of the function $\kappa_9$ (the left axis in FIG. 14) and the function $\kappa_{10}$ (the right axis in FIG. 14) with respect to the relative refractive index difference $\Delta_1$ when the radius $a_1$ is set to 1.0 µm, 2.0 µm and 4.3 µm are shown in FIG. 14. When the relative refractive index difference $\Delta_1$ is 0.0% as described above, the relationships between the relative refractive index difference $\Delta_1$ and the functions $\kappa_9$ and $\kappa_{10}$ are expressed by Equations (21) and (22) using the functions $\kappa_{11}(a_1)$, $\kappa_{12}(a_1)$ and $\kappa_{13}(a_1)$ having the radius $a_1$ as a variable.

[Equation 23]

$$K_9 = -7.490 + K_{11}(a_1)\Delta_1 + K_{12}(a_1)\Delta_1^2 \quad (21)$$

[Equation 24]

$$K_{10} = -1.876 + K_{13}(a_1)\Delta_1 \quad (22)$$

When the radius $a_1$ is 4.3 µm and the relative refractive index difference $\Delta_1$ is equal to or less than −0.531%, the cutoff wavelength is equal to or greater than 1.53 µm regardless of the radius $a_2$ and the relative refractive index difference $\Delta_2$. Accordingly, when the radius $a_1$ is 4.3 µm, Equations (21) and (22) are applied to a structure of the SMF in which the relative refractive index difference $\Delta_1$ is equal to or higher than −0.531%.

Figure 15:
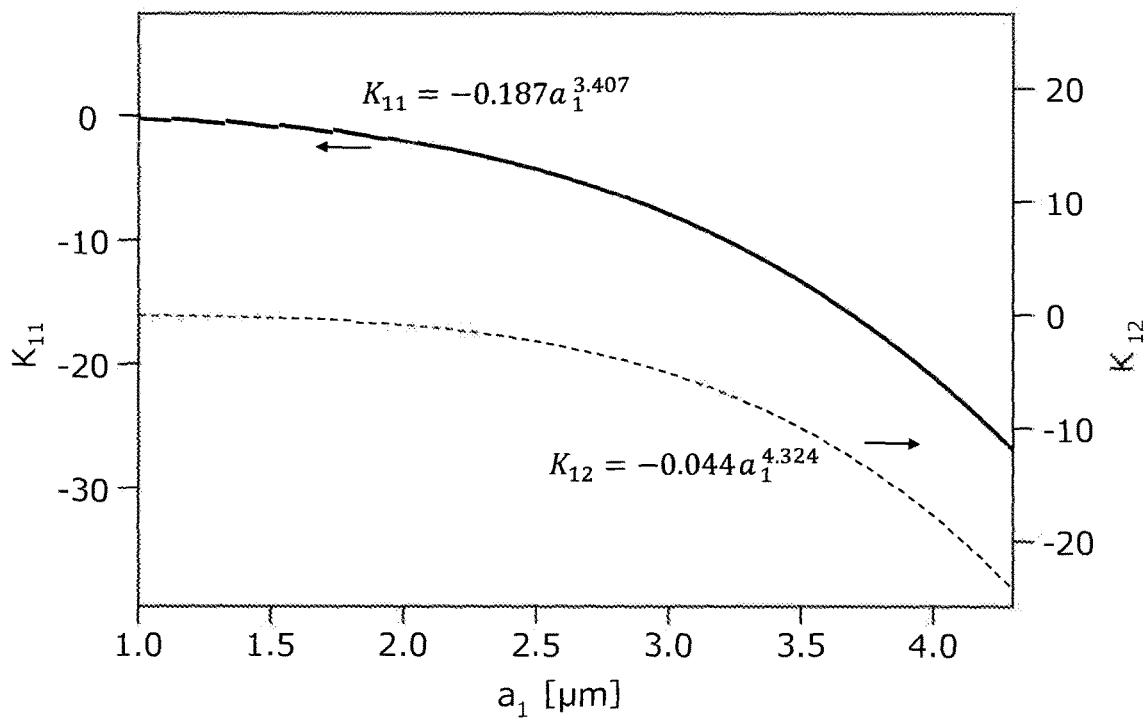
FIG. 15 is a graph showing a relationship between fitting coefficients $\kappa_{11}$ and $\kappa_{12}$ of the cutoff wavelength and the radius $a_1$ of the core of the SMF according to the invention.

Variations of the function $\kappa_{11}$ (the left axis in FIG. 15) and the function $\kappa_{12}$ (the right axis in FIG. 15) with respect to the radius $a_1$ are shown in FIG. 15. When the radius $a_1$ is 0.0 µm, both the functions $\kappa_{11}$ and $\kappa_{12}$ lose dependency on the relative refractive index difference $\Delta_1$ and thus the functions $\kappa_{11}$ and $\kappa_{12}$ are 0 (zero). The curve which is shown as a solid line in FIG. 15 is expressed by Equation (23). The curve which is shown as a dotted line in FIG. 15 is expressed by Equation (24).

[Equation 25]

$$K_{11} = -0.187a_1^{3.407} \quad (23)$$

[Equation 26]

$$K_{12} = -0.044a_1^{4.324} \quad (24)$$

Figure 16:
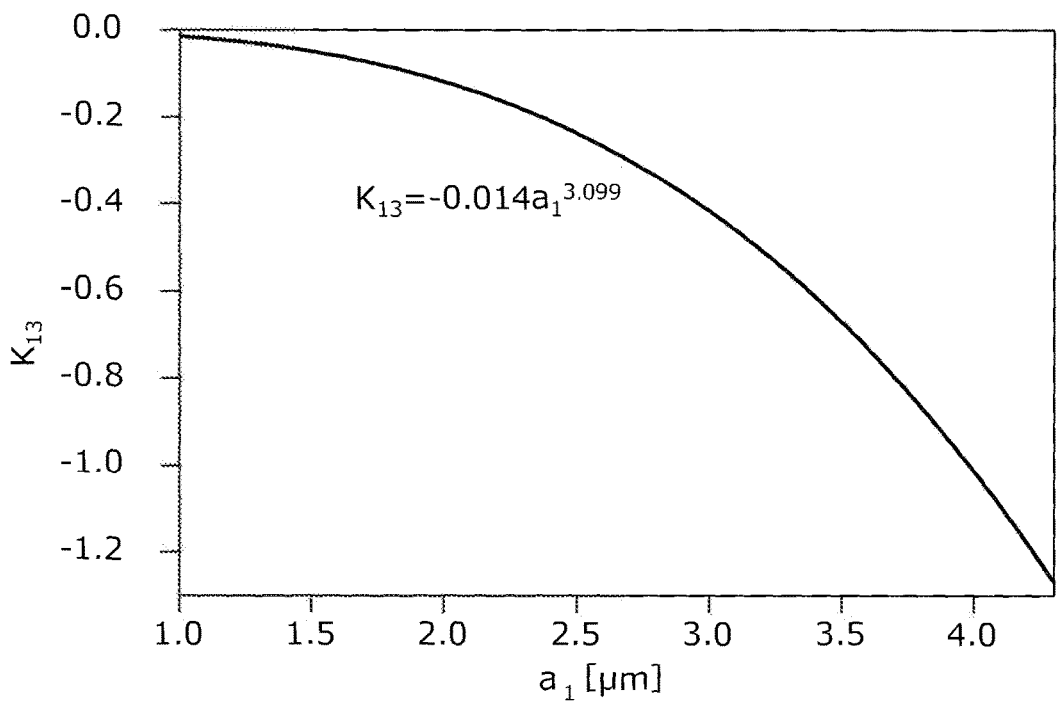
FIG. 16 is a graph showing a relationship between a fitting coefficient $\kappa_{13}$ of the cutoff wavelength and the radius $a_1$ of the core of the SMF according to the invention.

A variation of the function $\kappa_{13}$ with respect to the radius $a_1$ is shown in FIG. 16. When the radius $a_1$ is 0.0 µm, the function $\kappa_{13}$ loses dependency on the relative refractive index difference $\Delta_1$ and thus the function $\kappa_{13}$ is 0 (zero). The curve which is shown as a solid line in FIG. 16 is expressed by Equation (25).

[Equation 27]

$$K_{13} = -0.014a_1^{3.099} \quad (25)$$

Based on the above description, by expressing the boundary of the structure of the SMF according to the second embodiment in which the cutoff wavelength is equal to or less than 1.53 µm using the radius $a_1$, the relative refractive index difference $\Delta_1$ and the radius $a_2$, the relative refractive index difference $\Delta_2$ is expressed by Equation (3).

[Equation 28]

$$\Delta_2 \geq -0.033 + (-7.490 - 0.187a_1^{3.407}\Delta_1 - 0.044a_1^{4.324}\Delta_1^2)$$
$$a_2^{-1.876 - 0.014a_1^{3.099}\Delta_1} \quad (3)$$

The above-mentioned SMF according to the second embodiment is designed such that the radii $a_1$ and $a_2$ and the relative refractive index differences $\Delta_1$ and $\Delta_2$ satisfy the above-mentioned suitable conditions.

In the invention, by performing design such that the radius $a_1$ is in a range of equal to or greater than 1.0 μm and equal to or less than 4.3 μm, suitable design areas of the radius $a_2$ and the relative refractive index difference $\Delta_1$ which are expressed by Equations (1) and (2) are specified in the SMF based on Recommendation G.654.D. Similarly, in the SMF based on Recommendation G.654.E, suitable design areas of the radius $a_2$ and the relative refractive index difference $\Delta_1$ which are expressed by Equations (18) and (19) are specified. In the suitable areas, the achievable delay time of the SMF is roughly determined according to the relative refractive index difference $\Delta_1$ and increases as the relative refractive index difference $\Delta_1$ decreases. By appropriately selecting the radii $a_1$ and $a_2$ and the relative refractive index difference $\Delta_1$ in the above-mentioned suitable areas, the cutoff wavelength satisfies the conditions which are required to apply the SMF to a long-distance communication network and the relative refractive index difference $\Delta_2$ is determined according to Equation (3).

Figure 17:
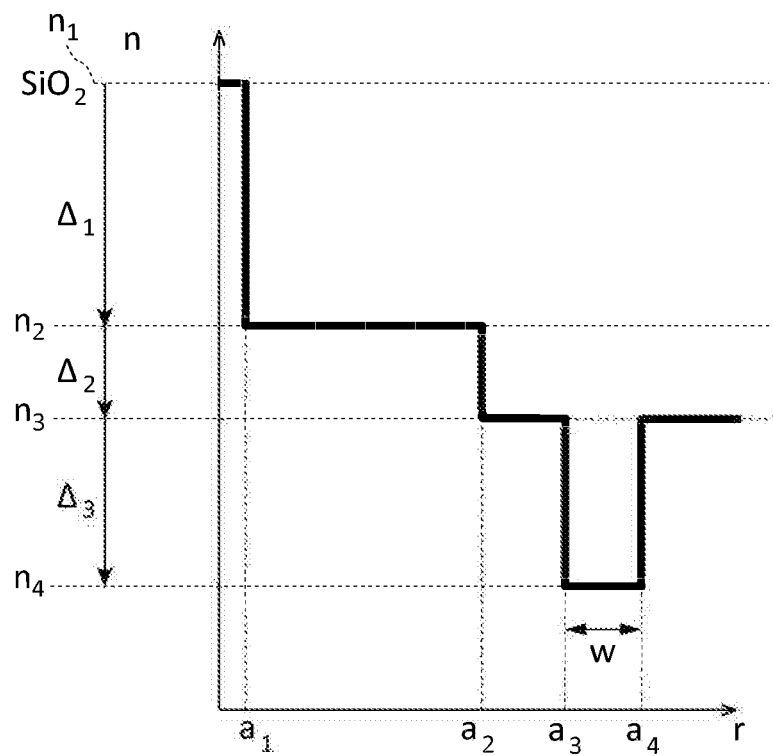
FIG. 17 is a diagram showing a refractive index distribution of the SMF according to the invention having a low-index layer in a second clad.

The second clad of the SMF according to the second embodiment is not limited to the second clad with the refractive index distribution which is shown in FIG. 2. An example of a refractive index distribution in which a low-index area in which the refractive index is defined as $n_4$ and a relative refractive index difference from the second clad is defined as $\Delta_3$ is provided in an area with a width w from a radius $a_3$ to a radius $a_4$ of the second clad which is shown in FIG. 17. That is, the radius $a_3$ is greater than the radius $a_2$ and the refractive index $n_4$ is lower than the refractive index $n_3$. It is known that the low-index area of the second clad relaxes trade-off which is caused in the optical characteristics such as the MFD or the bending loss. With the SMF according to the second embodiment, the design area is expected to be suitably enlarged. By forming a hole instead of the low-index area in the second clad, the same advantageous effects as in the SMF including the low-index area in the second clad are obtained.

Third Embodiment

Figure 18:
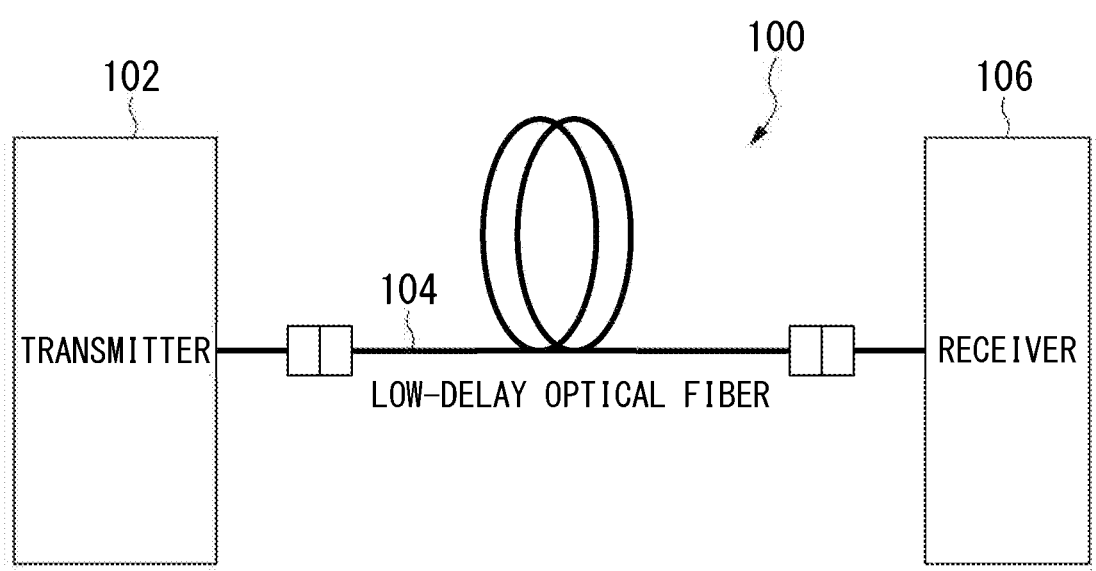
FIG. 18 is a diagram showing an example of an optical transmission system including the SMF according to the invention.

A configuration of an optical transmission system 100 according to the invention is shown in FIG. 18. The optical transmission system 100 includes a transmitter 102, the optical fiber (SMF) 104 according to the invention and a receiver 106. The transmitter 102 and the optical fiber 104 are connected to each other via a connector. The optical fiber 104 and the receiver 106 are connected to each other via a connector. Since the optical transmission system 100 includes the optical fiber 104, a transmission delay of the optical transmission system 100 decreases. Accordingly, the optical transmission system 100 can respond to a demand for a reduction in delay time between the transmitter 102 and the receiver 106.

Fourth Embodiment

Structures of optical fibers 51, 52, 53 and 54 which are single-conductor optical fibers and in which a plurality of cores are disposed in a sectional view crossing the longitudinal direction are shown in FIGS. 19A, 19B, 19C and 19D. One or more cores of the optical fibers 51, 52, 53 and 54 are low-delay cores which satisfy the conditions described above in the first embodiment or the second embodiment and which can reduce a delay time of the optical fiber.

Figure 19A:
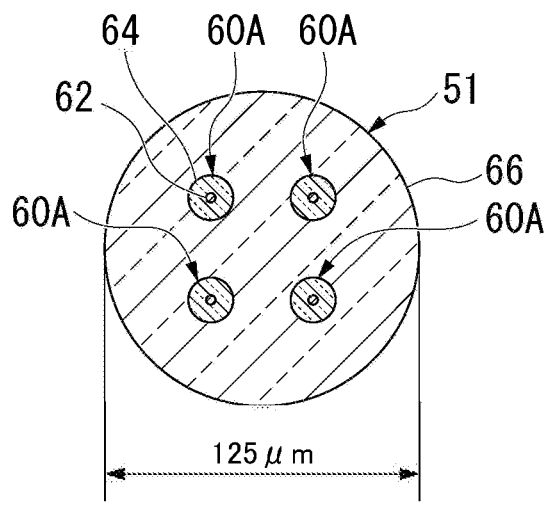
FIG. 19A is a sectional view of a first example of an optical fiber according to the invention including a plurality of cores.
Figure 19B:
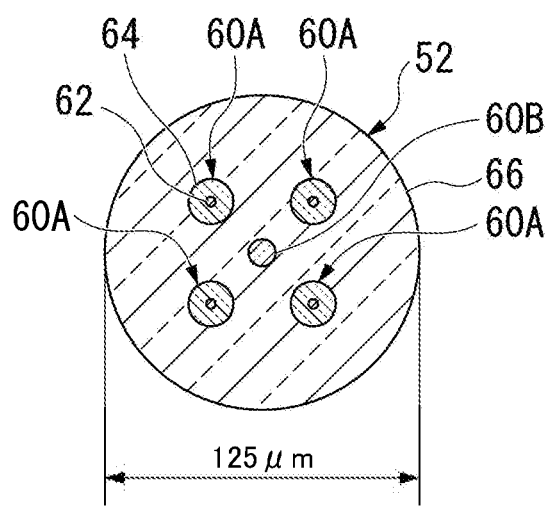
FIG. 19B is a sectional view of a second example of an optical fiber according to the invention including a plurality of cores.
Figure 19C:
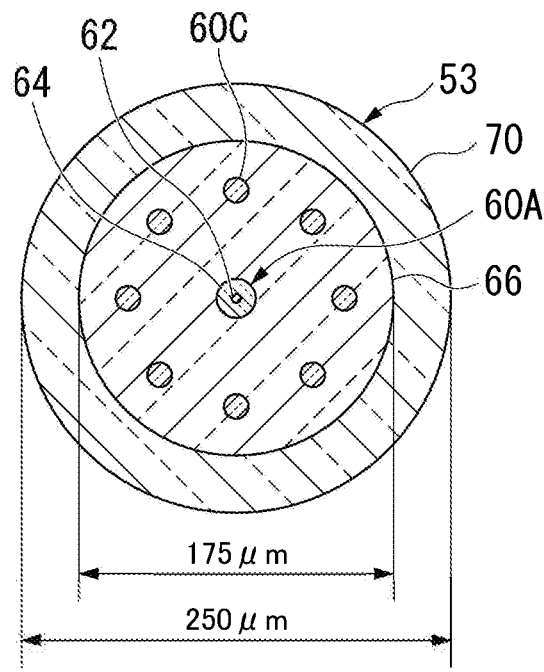
FIG. 19C is a sectional view of a third example of an optical fiber according to the invention including a single core.
Figure 19D:
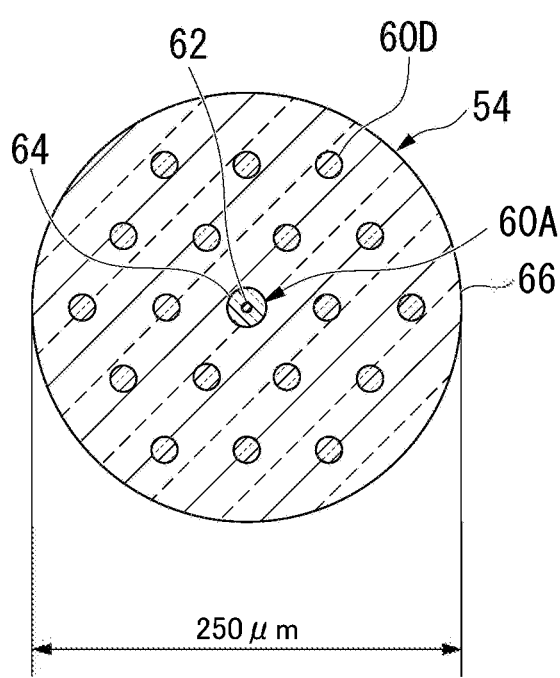
FIG. 19D is a sectional view of a fourth example of an optical fiber according to the invention including a single core.

A sectional surface of an optical fiber in which only four low-delay cores 60A are disposed in a second clad 66 (that is, the second clad in the first embodiment and the second embodiment) with a diameter of 125 μm is shown in FIG. 19A. Each low-delay core 60A includes a core (a first core) 62 at the center in a sectional view and a first clad 64 that is disposed on an outer circumferential portion of the core 62. A sectional surface of an optical fiber in which a core (a second core) 60B is disposed at the center of a second clad 66 with an outer diameter of 125 μm and four low-delay cores 60A are disposed on a concentric circle centered on the core 60B is shown in FIG. 19B. A sectional surface of an optical fiber including a second clad 66 with a diameter of 175 μm and a coating 70 with a diameter of 250 μm that is disposed on an outer circumferential portion of the second clad 66 is shown in FIG. 19C. In the SMF which is shown in FIG. 19C, a low-delay core 60A is disposed at the center of the second clad 66 and cores (third cores) 60C are disposed on a concentric circle centered on the low-delay core 60A. A sectional surface of an optical fiber in which a low-delay core 60A is disposed at the center of a second clad 66 with a diameter of 250 μm which is thought to be a maximum diameter of the clad with which reliability can be secured and a plurality of cores (fourth cores) 60D are disposed in a hexagonal shape with intervals interposed therebetween (that is, packed most closely) in the second clad outside the low-delay core 60A is shown in FIG. 19D.

With the optical transmission system including the optical fibers 51, 52, 53 and 54 which are shown in FIGS. 19A to 19D, the optical communication according to the related art and optical communication with a reduced delay time can be simultaneously and suitably realized.

Fifth Embodiment

Figure 20:
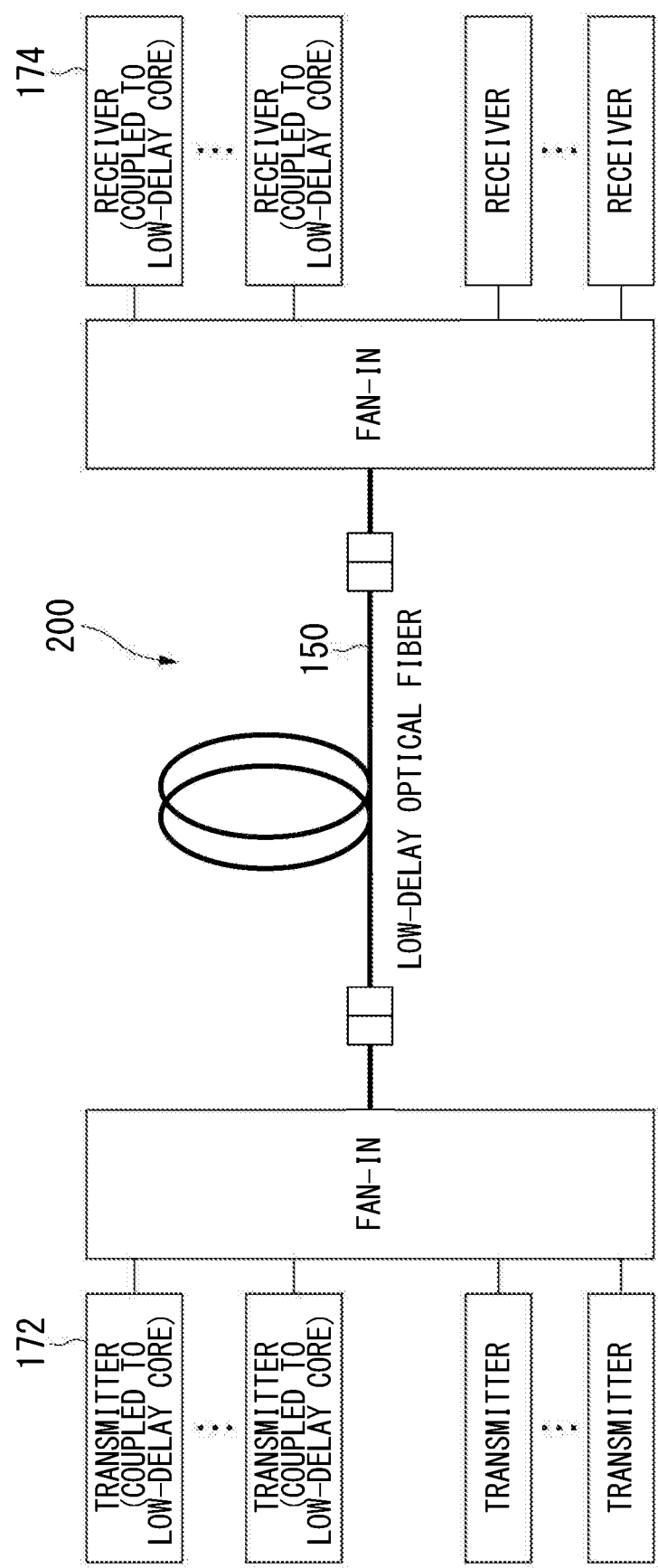
FIG. 20 is a diagram showing an example of an optical transmission system using the optical fiber according to the invention.

An optical transmission system 200 including the optical fiber according to the invention is shown in FIG. 20. The optical transmission system 200 includes an SMF (an optical fiber) 150, a plurality of transmitters 172 and a plurality of receivers 174. The SMF 150 may be one of the SMFs according to the first to third embodiments and the optical fibers 51, 52, 53 and 54 according to the fourth embodiment. At least one of the plurality of transmitters 172 is coupled to one end of the SMF 150 via a fan-in device. At least one of the plurality of receivers 174 is coupled to the other end of the SMF 150 via a fan-in device. With the optical transmission system 200, the optical communication according to the related art and the optical communication with a decreased transmission delay can be simultaneously realized. Accordingly, the optical transmission system 200 is capable of flexibly responding to a demand for a reduction of delay time in a transmission line.

(Preferable Design Conditions of the Optical Fiber)

Figure 21:
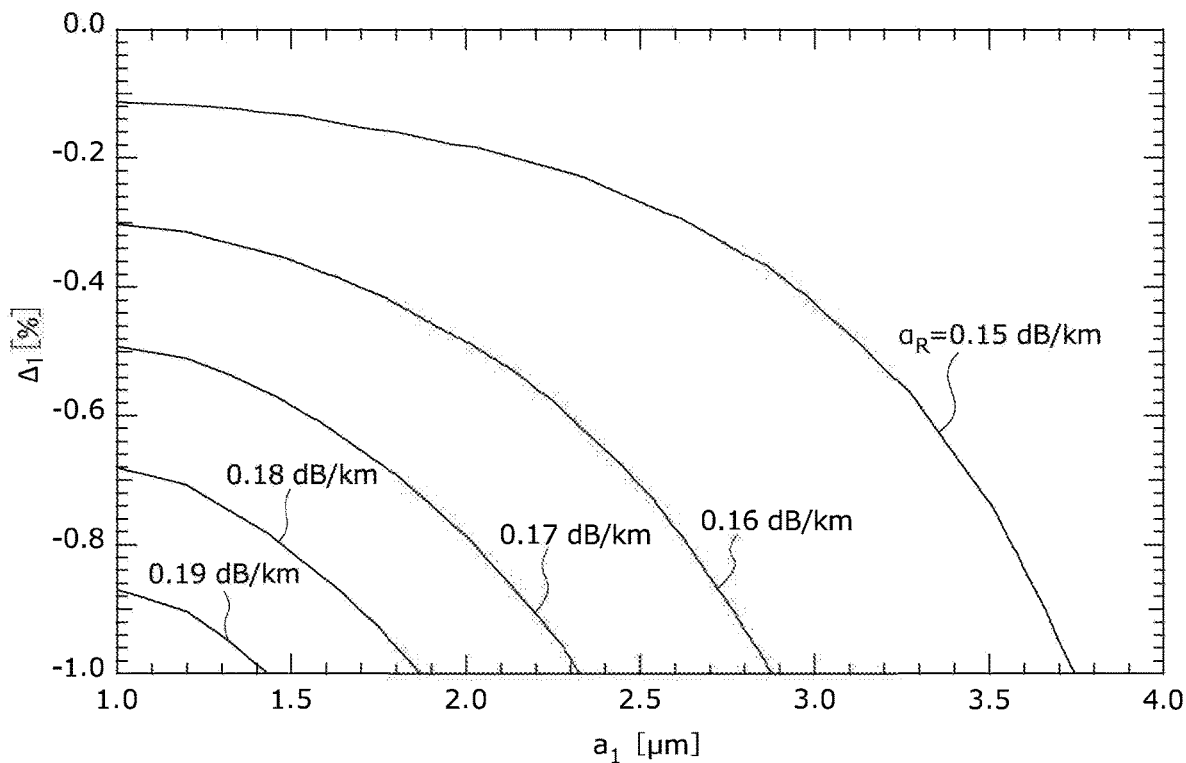
FIG. 21 is a graph showing a relationship between a radius of a core and a Rayleigh scattering loss which is applied to an electric field distribution by the core and a first clad when a mode field diameter is 11.5 μm in the optical fiber according to the invention.
Figure 22:
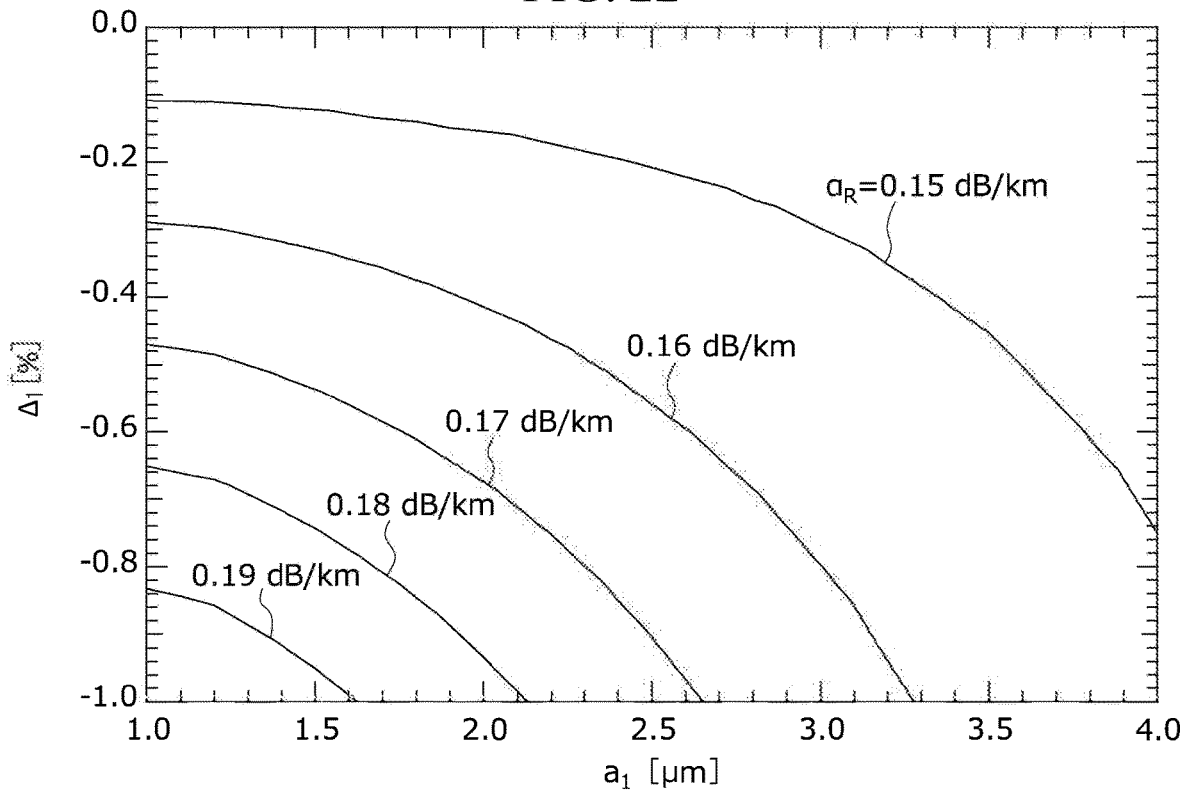
FIG. 22 is a graph showing a relationship between a radius $a_1$ and a Rayleigh scattering loss which is applied to an electric field distribution by a core and a first clad when a mode field diameter is 15.0 μm in the optical fiber according to the invention.

A result of numerical calculation of the relationship between the radius $a_1$ and the relative refractive index difference $\Delta_1$ with respect to a Rayleigh scattering loss $\alpha_R$ due to an influence of the first clad on an electric field distribution of light which is transmitted by the core of the SMF when the MFD is 11.5 μm is shown in FIG. 21. A result of numerical calculation of the relationship between the radius $a_1$ and the relative refractive index difference $\Delta_1$ with respect to the Rayleigh scattering loss $\alpha_R$ due to an influence of the first clad on the electric field distribution of light which is transmitted by the core of the SMF when the MFD is 15.0 μm is shown in FIG. 22. As shown in FIGS. 21 and 22, it can be seen that the Rayleigh scattering loss $\alpha_R$ of the SMF increases by decreasing the radius $a_1$ and decreasing the relative refractive index difference $\Delta_1$.

Figure 23:
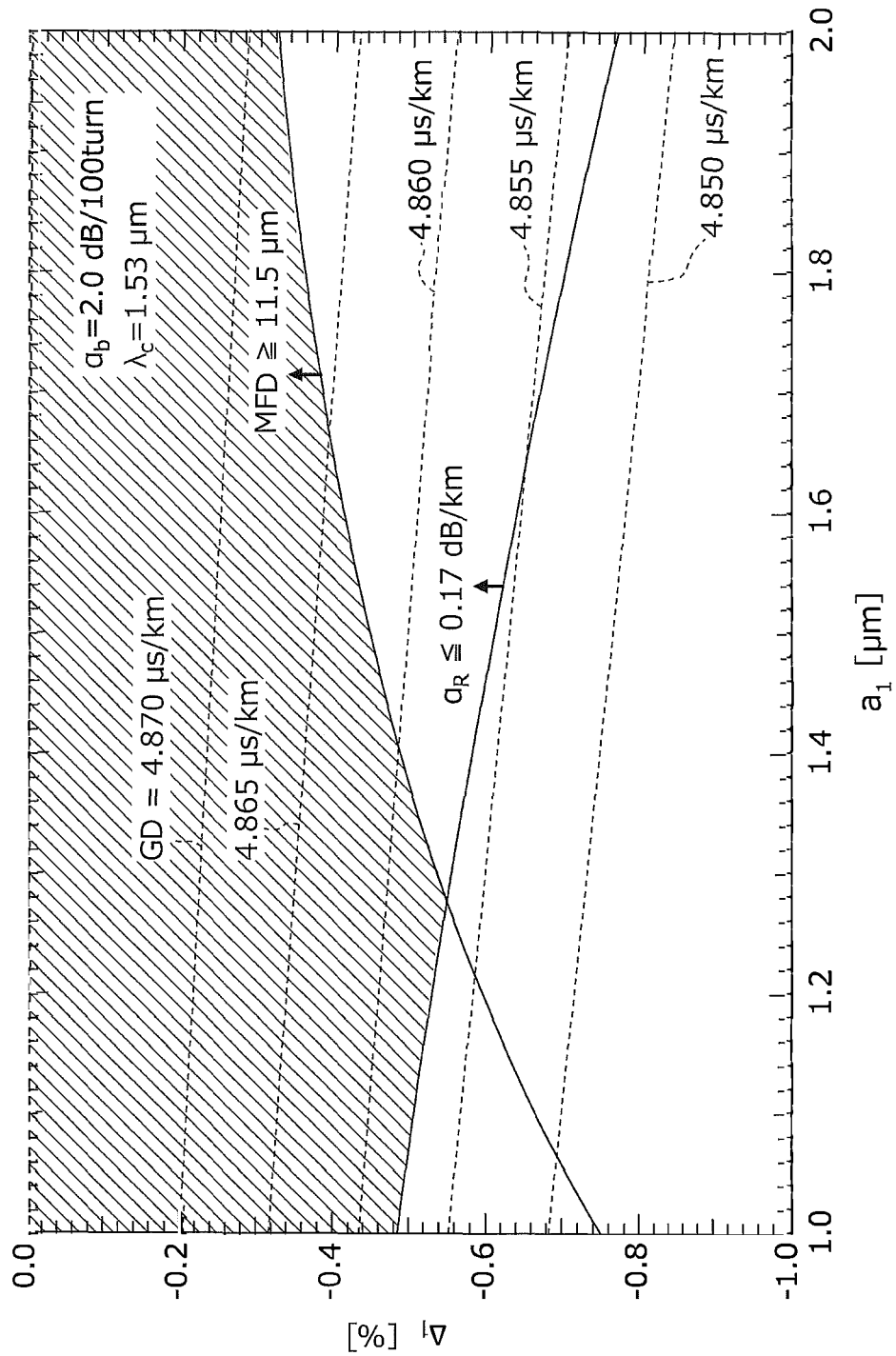
FIG. 23 is a graph showing a relationship between a Rayleigh scattering loss $\alpha_R$, an MFD, a group delay time of light which is transmitted in a core per unit length and the radius $a_1$ in the optical fiber according to the invention based on Recommendation G.654.D.
Figure 24:
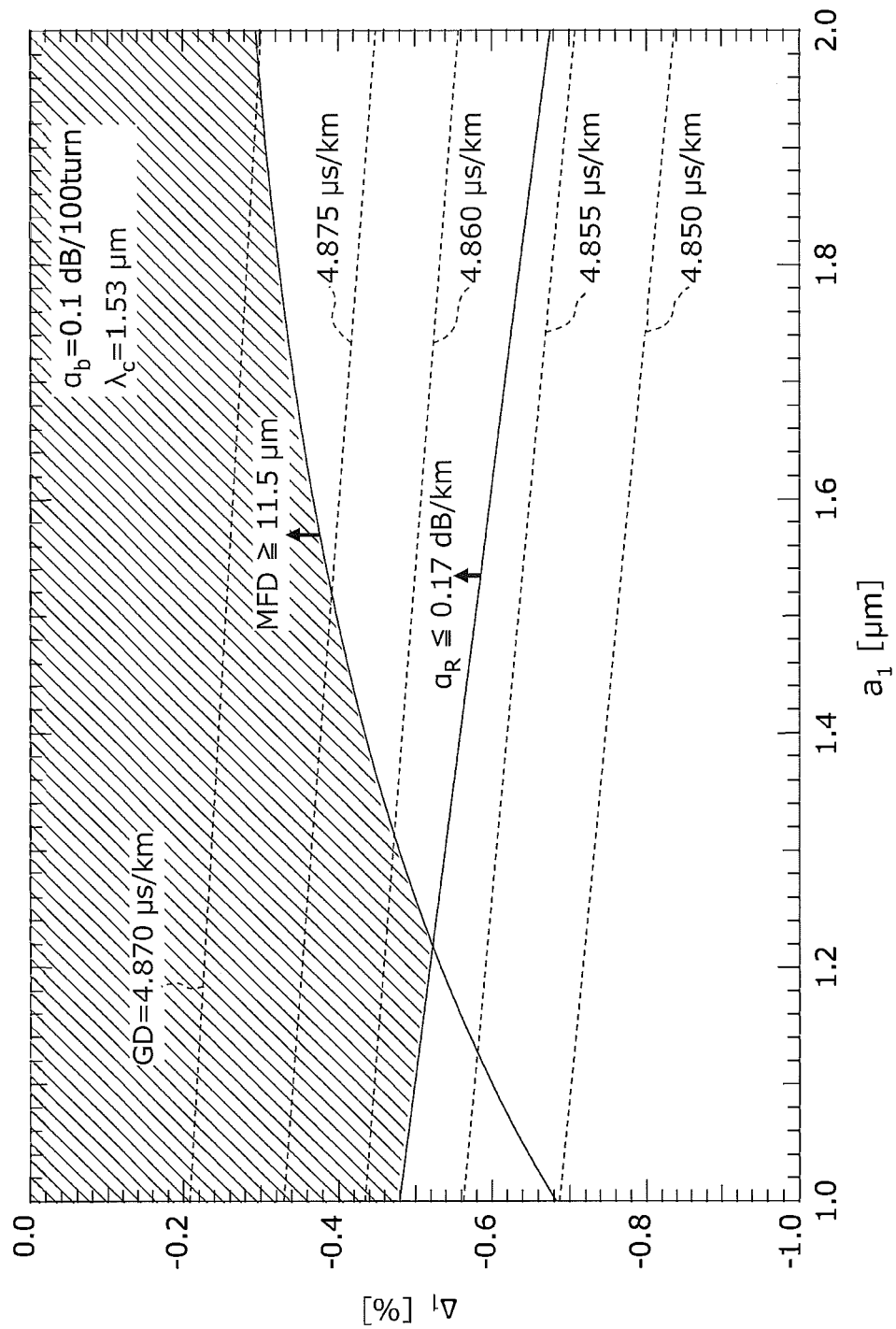
FIG. 24 is a graph showing a relationship between a Rayleigh scattering loss $\alpha_R$, an MFD, a group delay time of light which is transmitted in a core per unit length and the radius $a_1$ in the optical fiber according to the invention based on Recommendation G.654.E.

A relationship between the Rayleigh scattering loss $\alpha_R$, the MFD, the group delay time of light which is transmitted by the core per unit length, and the radius $a_1$ in the SMF based on Recommendation G.654.D based on the results of numerical calculation which are shown in FIGS. 21 and 22 is shown in FIG. 23. A relationship between the Rayleigh scattering loss $\alpha_R$, the MFD, the group delay time of light which is transmitted by the core per unit length, and the radius $a_1$ in the SMF based on Recommendation G.654.E based on the results of numerical calculation which are shown in FIGS. 21 and 22 is shown in FIG. 24.

The Rayleigh scattering loss $\Delta_R$ of a conventional SMF is considered to be about 0.17 dB/km. In consideration that the group delay time of the cutoff shift fiber (CSF) is about 4.877 μs/km, the optical characteristics based on Recommendation G.654.D and Recommendation G.654.E and low loss and low delay time can be simultaneously realized and a more suitable design area of the optical fiber according to the invention can be provided, by setting the radius $a_1$ and the relative refractive index difference $\Delta_1$ corresponding to the hatched parts in FIGS. 23 and 24. The hatched parts in FIGS. 23 and 24 represent a range in which the boundary in which the MFD is equal to or greater than 11.5 μm and the boundary in which the Rayleigh scattering loss $\alpha_R$ is 0.17 dB/km overlap each other toward a part in which the relative refractive index difference $\Delta_1$ is lower than the boundaries (that is, a part in which the relative refractive index difference $\Delta_1$ approaches 0 and an upper part in the graph which is shown in FIG. 13) such that the recommendations are satisfied. That is, in the above-mentioned embodiments, by additionally including conditions in which the Rayleigh scattering loss $\alpha_R$ is equal to or less than 0.17 dB/km, the optical characteristics based on Recommendation G.654.D and Recommendation G.654.E and the low loss and low delay time can be simultaneously realized and a more suitable design area can be provided.

Examples

Figure 25:
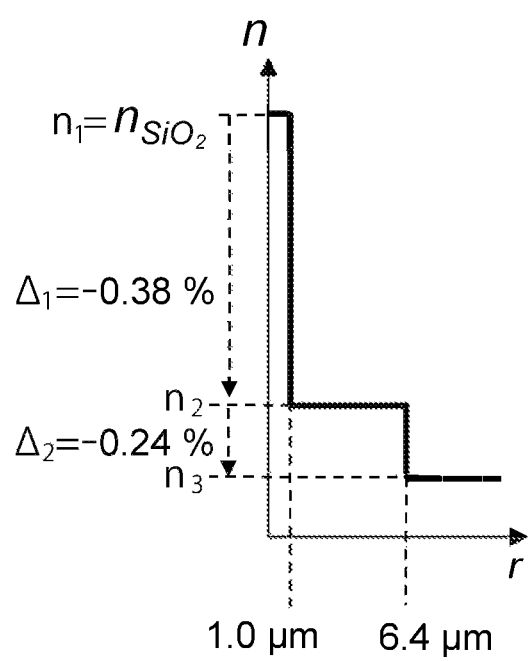
FIG. 25 is a diagram showing a refractive index distribution of an optical fiber according to the invention which has been manufactured by trial.

An SMF (an optical fiber) according to the invention was manufactured by trial in consideration of the design area, the relative relationship between parameters and the suitable conditions which have been described above in the embodiments. A refractive index distribution of the trial-manufactured SMF is shown in FIG. 25. Evaluation of characteristics of a conventional SMF and a CSF along with the trial-manufactured SMF according to the invention was carried out.

A wavelength serving in measuring an MFD, an effective sectional area $A_{eff}$, a bending loss per winding with a bending radius of 15 mm, a transmission loss, a Rayleigh scattering loss, a chromatic dispersion and a nonlinear coefficient, measurement results of each optical property and measurement methods used for various measurements in the optical fiber according to the invention which was manufactured by trial (hereinafter also referred to as a trial-manufactured optical fiber) are shown in FIG. 26. For the purpose of comparison, the same measurement as in the trial-manufactured optical fiber according to the invention (a "trial-manufactured optical fiber" in FIG. 26) was performed on the conventional SMF and the cutoff shift fiber (CSF) based on Recommendation G.654.D.

A structure of an optical fiber which was manufactured by trial in a design area of structure parameters based on Recommendation G.654.D in which characteristics of a cutoff shift fiber specified based on results of numerical calculation are prescribed is shown in FIG. 25. The trial-manufactured optical fiber includes a core which is formed of pure silica glass. The radius of the core is 1.0 μm and the radius of the first clad is 6.4 μm. The relative refractive index difference between the core and the first clad is −0.38%, and the relative refractive index difference between the first clad and the second clad is −0.24%.

As shown in FIG. 26, as designed, the trial-manufactured optical fiber has the equivalent MFD, the equivalent $A_{eff}$, the equivalent cutoff wavelength, and the equivalent bending loss as in the CSF. The transmission loss of the trial-manufactured optical fiber is as low as in the conventional SMF. The wavelength dispersion and the nonlinear coefficient of the trial-manufactured optical fiber have the equivalent values as in the CSF.

Figure 27:
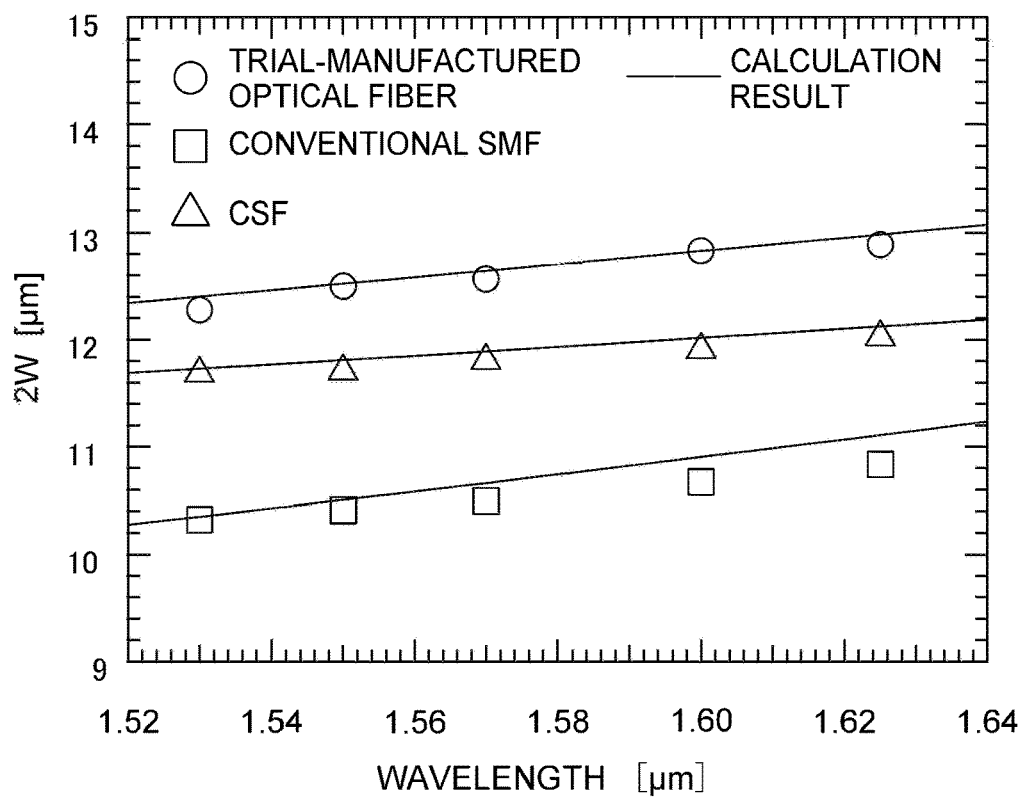
FIG. 27 is a graph showing results of measurement of wavelength dependency of an MFD in the various fibers.

Results of measurement of wavelength characteristics of the MFD of various fibers are shown in FIG. 27. In the trial-manufactured optical fiber, the MFD is enlarged to the similar extent to that of the CSF in the whole band from C-band to L-band. The tendency of enlargement of the MFD matches the results of numerical calculation represented by solid lines.

Figure 28:
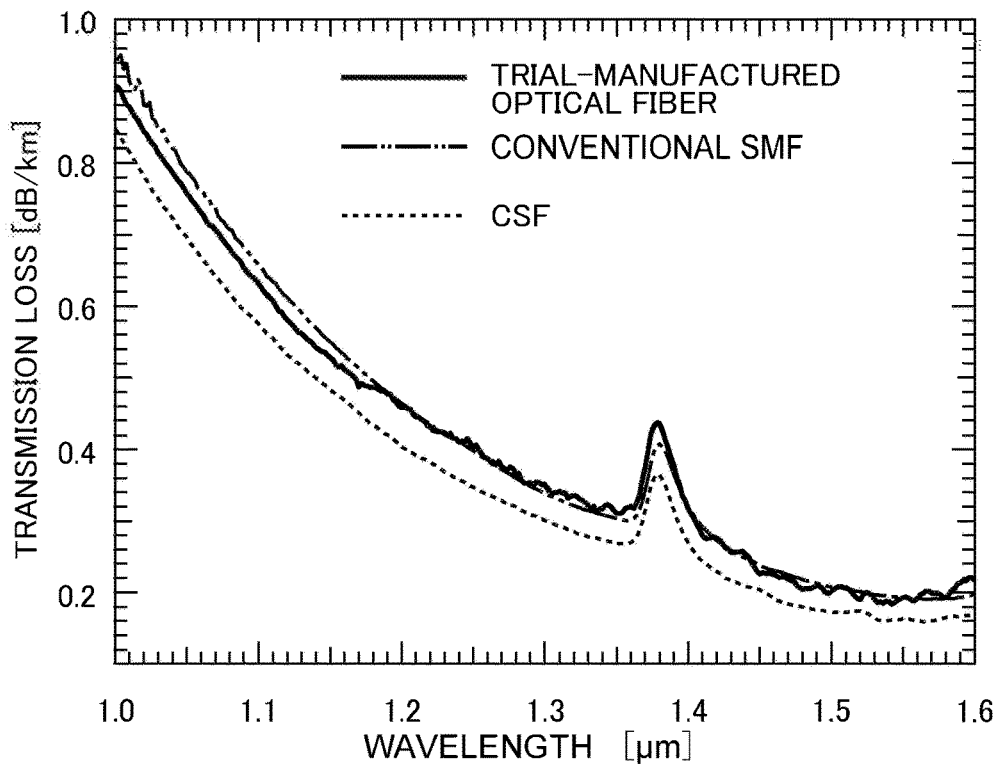
FIG. 28 is a graph showing results of measurement of wavelength dependency (a loss wavelength spectrum) of a transmission loss in the various fibers.

Results of measurement of a loss wavelength spectrum of various fibers are shown in FIG. 28. The shape of the loss wavelength spectrum of the trial-manufactured optical fiber is the similar to the shapes of the conventional SMF and the CSF. The transmission loss of the trial-manufactured optical fiber is equivalent to that of the conventional SMF in the whole range of measurement wavelengths.

Figure 29:
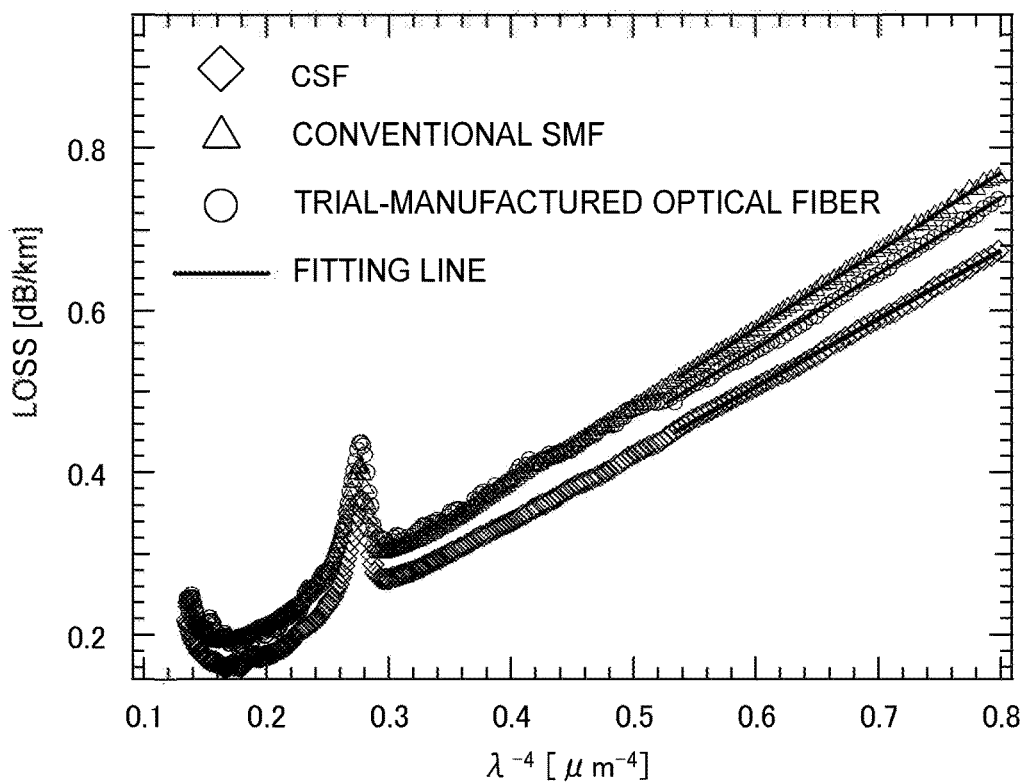
FIG. 29 is a graph showing plots with negative fourth power of wavelengths in the loss wavelength spectrum in the various fibers and fitting lines with the plots.

Results of a plot with [wavelength $\lambda$]$^{-4}$ in the loss wavelength spectrum which is shown in FIG. 28 are shown in FIG. 29. When the Rayleigh scattering loss at the wavelength of 1.55 μm is analyzed based on the slopes of fitting lines in the range of from 0.52 μm$^{-4}$ to 0.80 μm$^{-4}$ of $\lambda^{-4}$, the Rayleigh scattering loss is 0.161 dB/km in the trial-manufactured optical fiber, is 0.166 dB/km in the conventional SMF, and is 0.146 dB/km in the CSF. From these results, it is confirmed that the Rayleigh scattering loss of the trial-manufactured optical fiber is equivalent to that of the conventional SMF.

Figure 30:
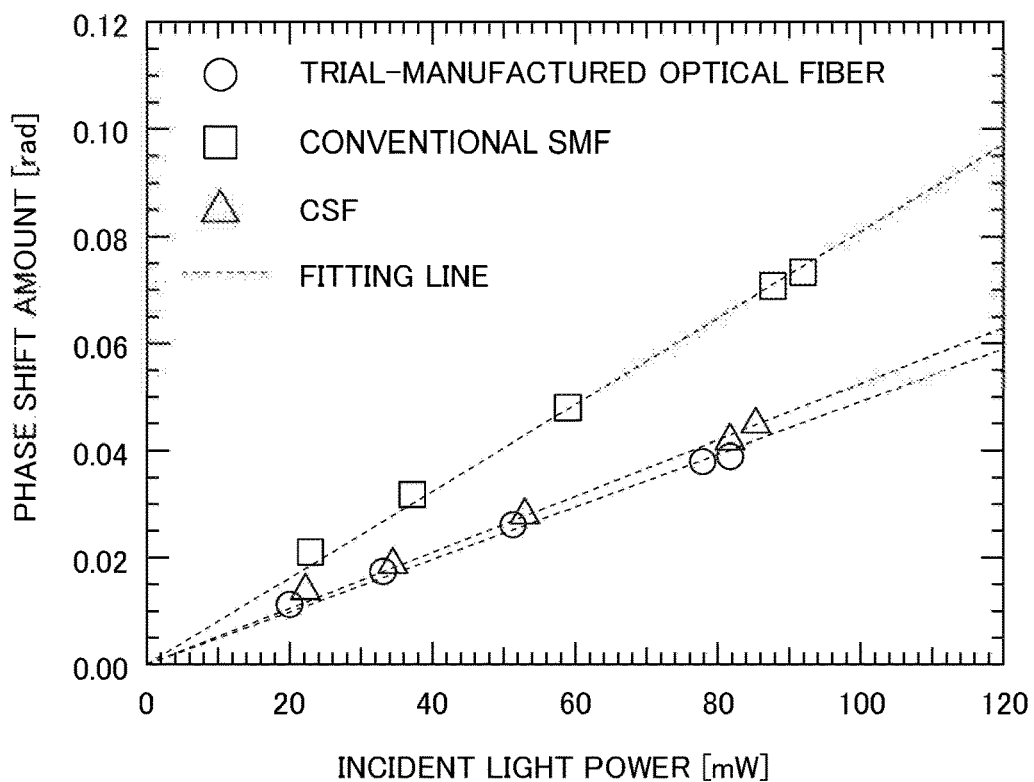
FIG. 30 is a graph showing measurement results of incident light power dependency of a phase shift amount based on a CW-SPM method in nonlinear coefficient evaluation of the various fibers and fitting lines of the measurement results.

Measurement results of incident light power dependency of a phase shift based on a CW-SPM method, which correspond a nonlinear coefficient evaluation of various fibers are shown in FIG. 30. In the CW-SPM, the nonlinear coefficient $(n_2/A_{eff})$ can be analyzed from the slope of the incident light power dependency of a phase shift amount using Equation (26).

$$\Phi_{SPM} = \frac{n_2}{A_{eff}} \frac{2\pi L_{eff}}{\lambda} P_{in} \tag{26}$$

In Equation (26), $\Phi_{SPM}$ represents a phase shift amount, $\lambda$ represents a wavelength, $L_{eff}$ represents an effective length of various fibers, and $P_{in}$ represents power of incident light on various fibers. The nonlinear coefficient which was analyzed based on the slope of the fitting line represented by a dotted line is 1.79×10$^{-10}$/W in the trial-manufactured optical fiber, 2.95×10$^{-10}$/W in the conventional SMF, and 1.90×10$^{-10}$/W in the CSF. From these results, it is confirmed that the trial-manufactured optical fiber has substantially the equivalent low nonlinearity to that in the CSF.

Figure 31:
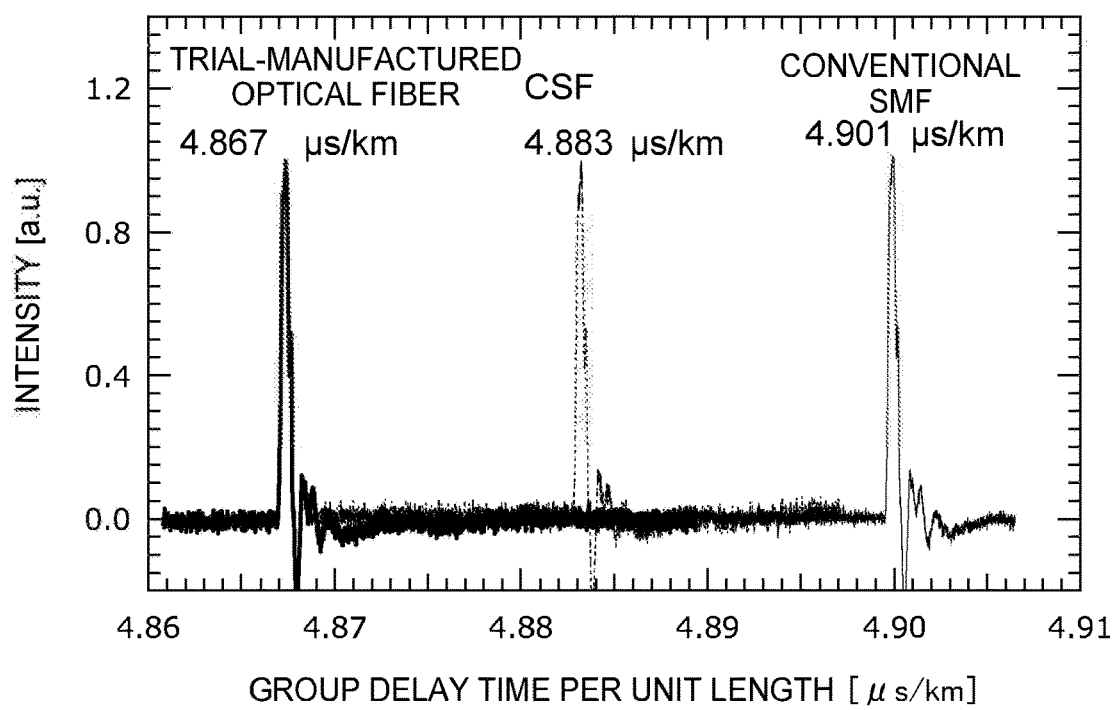
FIG. 31 is a graph showing measurement results of the group delay time based on an impulse response approach in the various fibers.

Measurement results of the group delay time based on an impulse response approach in various fibers are shown in FIG. 31. The horizontal axis of the graph which is shown in FIG. 31 represents the measured group delay time in terms of a group delay time per unit length. In measurement, a pulse width of a pulse which is emitted from a pulse light source was modulated in 100 ps and the length of the optical fiber to be measured was set to 350 m. In the CSF, the group delay time was reduced by 0.018 μs/km in comparison with the conventional SMF. On the other hand, in the trial-manufactured optical fiber, it is confirmed that the group delay time was reduced additionally by 0.016 μs/km in comparison with that of the CSF.

Figure 32:
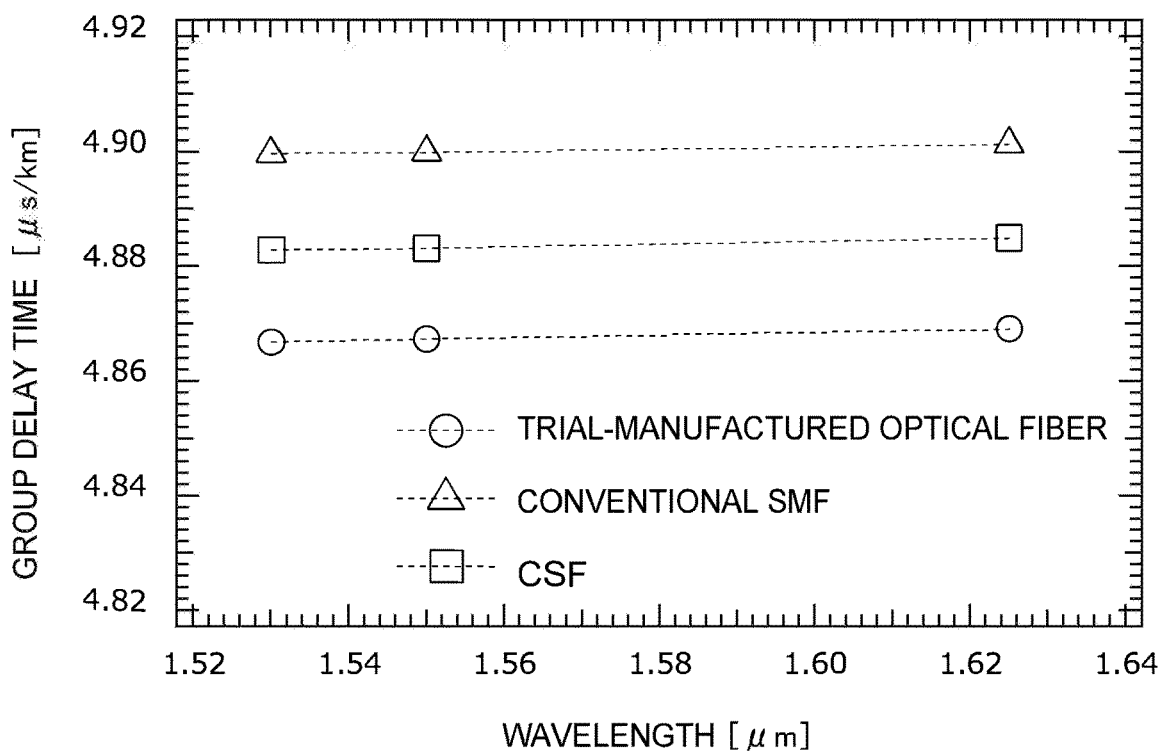
FIG. 32 is a graph showing measurement results of wavelength dependency of the group delay time based on the impulse response approach in the various fibers.

Measurement results of wavelength dependency in the range from C-band to L-band of the measurement result of the group delay time which is shown in FIG. 31 are shown in FIG. 32. It is confirmed that the group delay time of the trial-manufactured optical fiber was reduced by about 0.016 μs/km from that of the CSF in the whole range from C-band to L-band.

The conventional SMF has a three-layered structure including a core, a first clad, and a second clad, and the following parameters were used for the above-mentioned numerical calculation for the conventional SMF.

Radius of core: 3.5 μm
Radius of first clad: 6.5 μm
Relative refractive index difference between core and second clad: 0.38%
Radius of second clad: 62.5 μm
Relative refractive index difference between first clad and second clad: 0.05%
Refractive index of second clad (wavelength of 1.55 μm): 1.444377

The CSF has a three-layered structure including a core, a first clad, and a second clad and the following parameters were used for the above-mentioned numerical calculation for the CSF.

Radius of core: 6 μm
Refractive index of core (wavelength of 1.55 μm): 1.444377
Radius of first clad: 25 μm
Relative refractive index difference between first clad and core: −0.35%
Radius of second clad: 62.5 μm
Relative refractive index difference between second clad and the core: −0.25%

INDUSTRIAL APPLICABILITY

The invention is capable of being widely applied to optical fibers in areas of application in which a reduction of transmission delay is mainly required such as optical fibers for a long-distance communication network. The invention is capable of being applied to communication between terminals in an optical communication system.

REFERENCE SIGNS LIST

60A: Low-delay core
60B: Core (second core)
60C: Core (third core)
60D: Core (fourth core)
62: Core (first core)
150: SMF (optical fiber)
172: Transmitter
174: Receiver
$a_1$, $a_2$, $a_3$: Radius
$\Delta_1$, $\Delta_2$, $\Delta_3$: Relative refractive index difference

The invention claimed is:

1. An optical fiber, comprising:
a core;
a first clad that is provided on an outer circumferential portion of the core and has a refractive index lower than that of the core; and
a second clad that is provided on an outer circumferential portion of the first clad and has a refractive index lower than that of the first clad,
wherein a mode field diameter at a wavelength of 1.55 μm is equal to or greater than 11.5 μm,
wherein a cutoff wavelength is equal to or less than 1.53 μm,
wherein a bending loss at a bending radius of 30 mm and a wavelength of 1.625 μm is equal to or less than 2.0 dB/100 turns,
wherein a delay time of transmission light per unit length at a wavelength of 1.55 μm is equal to or less than 4.876 μs/km,
wherein a radius of the core is equal to or greater than 1.0 μm and equal to or less than 4.3 μm, and
wherein a radius of the first clad satisfies Equations (1) and (2):

[Equation 1]
$$a_2 \geq 2\{(1.43a_1^{-1.45})^2 - (\Delta_1 + 1.43a_1^{-1.45})^2\}^{-0.50a_1^{-0.37}} \quad (1)$$

[Equation 2]
$$5.56 - 3.94\log\left(1 + \frac{\Delta_1}{0.19 + 0.69a_1^{-2.00}}\right) \leq \quad (2)$$
$$a_2 \leq 7.68 + (1.14 - 2.51a_1)\log\left(1 + \frac{\Delta_1}{0.81a_1^{-0.77}}\right)$$

where $a_1$ in Equations (1) and (2) represents the radius [μm] of the core, $a_2$ represents the radius [μm] of the first clad, and $\Delta_1$ represents a relative refractive index difference [%] of the first clad from the core.

2. The optical fiber according to claim 1, wherein the relative refractive index difference of the second clad from the first clad satisfies Equation (3):

[Equation 3]
$$\Delta_2 \geq -0.033 + (-7.490 - 0.187a_1^{3.407}\Delta_1 - 0.044a_1^{4.324}\Delta_1^2)$$
$$a_2^{-1.876 - 0.014a_1^{3.099}\Delta_2} \quad (3),$$

where $\Delta_2$ represents the relative refractive index difference [%] of the second clad from the first clad.

3. The optical fiber according to claim 1 wherein, in a sectional view crossing a longitudinal direction, a plurality of low-delay cores including the core as a first core and the first clad provided on an outer circumferential portion of the first core are disposed on concentric circles at the center of the second clad.

4. The optical fiber according to claim 3, wherein the core is disposed as a second core at the center of the second clad.

5. The optical fiber according to claim 1, wherein, in a sectional view crossing a longitudinal direction, a low-delay core including the core as a first core and the first clad provided on an outer circumferential portion of the first core is disposed at the center of the second clad, and
wherein the core is disposed as a third core on a concentric circle at the center of the low-delay core.

6. The optical fiber according to claim 1, wherein, in a sectional view crossing a longitudinal direction, a low-delay core including the core as a first core and the first clad provided on an outer circumferential portion of the first core is disposed at the center of the second clad, and
wherein the cores are packed most closely as fourth cores around the low-delay core.

7. An optical transmission system, comprising:
the optical fiber according to claim 1;
a transmitter that is connected to one end of the optical fiber; and
a receiver that is connected to the other end of the optical fiber.

* * * * *